United States Patent [19]
Maeda et al.

[11] Patent Number: 6,074,283
[45] Date of Patent: Jun. 13, 2000

[54] LAPPING APPARATUS, LAPPING JIG FOR USE THEREIN AND WORKPIECE MOUNTING MEMBER ATTACHED TO THE LAPPING JIG

[75] Inventors: Hiroshi Maeda; Yoshifumi Mizoshita; Toshiyuki Satoh; Takahiro Imamura; Toru Kohei, all of Kawasaki, Japan

[73] Assignee: Fujitsu Limited, Kawasaki, Japan

[21] Appl. No.: 09/044,562

[22] Filed: Mar. 19, 1998

[30] Foreign Application Priority Data

Aug. 6, 1997 [JP] Japan ................................ 9-211742
Dec. 26, 1997 [JP] Japan ................................ 9-360436

[51] Int. Cl.[7] ................................................. B24B 55/02
[52] U.S. Cl. .................................... 451/53; 451/5; 451/7
[58] Field of Search ..................... 451/5, 7, 53; 100/322; 264/162; 219/200, 201

[56] References Cited

U.S. PATENT DOCUMENTS

| | | | |
|---|---|---|---|
| 4,450,652 | 5/1984 | Walsh | 451/7 |
| 4,457,114 | 7/1984 | Hennenfent et al. | 451/364 |
| 4,471,579 | 9/1984 | Boveniepen | 451/7 |
| 4,484,418 | 11/1984 | Reich et al. | 451/41 |
| 4,517,041 | 5/1985 | Hennenfent et al. | 156/155 |
| 4,728,232 | 3/1988 | Babel | 409/135 |
| 4,914,868 | 4/1990 | Church et al. | 451/5 |
| 5,117,589 | 6/1992 | Bischoff et al. | 451/405 |
| 5,605,488 | 2/1997 | Ohashi et al. | 451/7 |
| 5,957,750 | 9/1999 | Brunelli | 451/7 |
| 5,980,363 | 11/1999 | Meikle et al. | 451/41 |

*Primary Examiner*—Joseph J. Hail, III
*Assistant Examiner*—Dermott J. Cooke
*Attorney, Agent, or Firm*—Greer, Burns & Crain, Ltd.

[57] ABSTRACT

A compact and simple lapping apparatus in which, even if projections and depressions are formed in the circumferential direction on the top surface of a lapping plate, a workpiece and a bar are hard to damage and the polished surface of the workpiece is kept in good condition. This apparatus is provided with at least one lapping jig in which a workpiece is placed on the rotating top surface of the lapping plate. Further, a lapping head adapted to be able to rotate only in a direction on the lapping plate is attached to this lapping jig. This lapping head is equipped with a workpiece and at least two dummy work materials (or stock) so that these dummy works compose (as-polished) surfaces, which should be polished, together with the workpiece. Moreover, a device for detecting the remaining part of the workpiece to be lapped is provided on the workpiece. Furthermore, this lapping apparatus is configured so that a detection signal, which represents the detected remaining part of the workpiece and is outputted from the rotating lapping head, is sent to and a correction signal is sent from a control unit to the lapping correction device through a slip ring. A workpiece is polished while rotated on the lapping plate. Thus, the polished surface of the workpiece is kept in good condition.

128 Claims, 19 Drawing Sheets

LAPPING

Fig.12A

| LAPPING TIME | HEIGHT OF MR DEVICE | | | KIND OF CORRECTION |
|---|---|---|---|---|
| | LEFT | CENTER | RIGHT | |
| t1 | 3.5 | 3.8 | 3.5 | ENERGIZE HEATER 55 |
| t2 | 3.2 | 2.9 | 3.2 | ENERGIZE HEATER 54 |
| t3 | 2.8 | 2.8 | 2.8 | MAINTAIN POWER OF HEATER 54 |

Fig.12B

| LAPPING TIME | HEIGHT OF MR DEVICE | | | KIND OF CORRECTION |
|---|---|---|---|---|
| | LEFT | CENTER | RIGHT | |
| T1 | 4.1 | 3.9 | 3.7 | ENERGIZE LEFT-HAND SIDE SOLENOID |
| T2 | 3.3 | 3.4 | 3.5 | ENERGIZE RIGHT-HAND SIDE SOLENOID |
| T3 | 2.8 | 2.8 | 2.8 | NON-ENERGIZE BOTH SOLENOIDS |

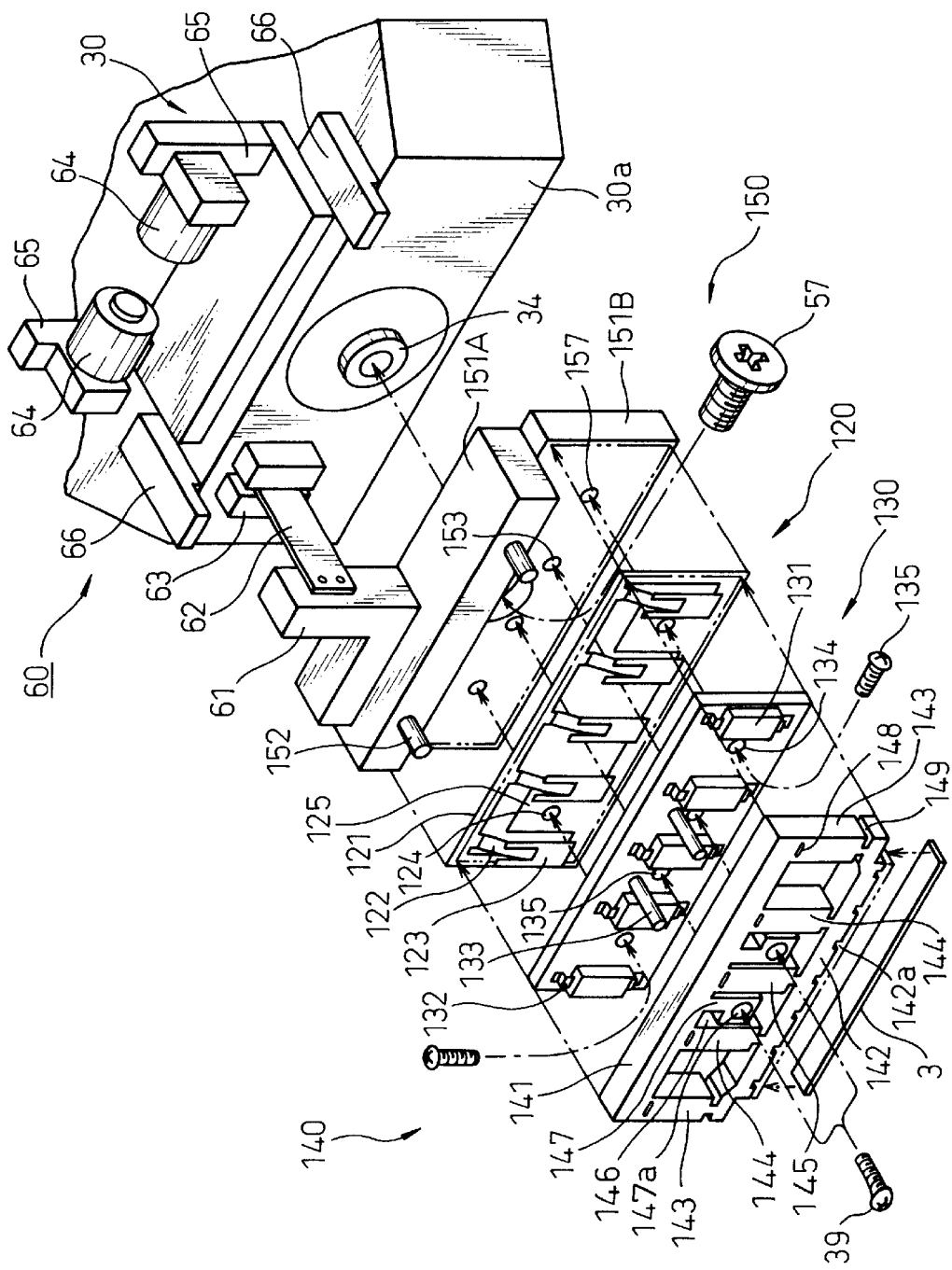

Fig. 20A

| LAPPING TIME | HEIGHT OF MR DEVICE | | | | | HEATER-CURRENT RATE | | | | | KINDS OF OPERATION |
|---|---|---|---|---|---|---|---|---|---|---|---|
| | A | B | C | D | E | A | B | C | D | E | |
| t1 | 4.0 | 4.2 | 3.8 | 4.1 | 4.0 | 0 | 20 | 30 | 10 | 0 | ① |
| t2 | 3.8 | 3.83 | 3.8 | 3.9 | 3.8 | 0 | 22 | 30 | 15 | 0 | ② |
| t3 | 3.6 | 3.6 | 3.67 | 3.67 | 3.6 | 0 | 22 | 30 | 17 | 0 | ③ |
| t4 | 3.2 | 3.2 | 3.2 | 3.2 | 3.2 | 0 | 22 | 30 | 16 | 0 | ④ |

(KINDS OF OPERATION)
①: INITIATION OF ENERGIZATION OF HEATER
②, ③: CONTROL OF CURRENT RATE
④: MAINTAINING OF ENERGIZATION OF HEATER

Fig. 20B

| LAPPING TIME | HEIGHT OF MR DEVICE | | | | | KIND OF CORRECTION |
|---|---|---|---|---|---|---|
| | A | B | C | D | E | |
| T1 | 4.0 | 3.95 | 3.9 | 3.85 | 3.8 | ENERGIZE LEFT-HAND SIDE SOLENOID |
| T2 | 3.5 | 3.55 | 3.6 | 3.65 | 3.7 | ENERGIZE RIGHT-HAND SIDE SOLENOID |
| T3 | 3.2 | 3.2 | 3.2 | 3.2 | 3.2 | NON-ENERGIZE BOTH SOLENOIDS |

LAPPING APPARATUS, LAPPING JIG FOR USE THEREIN AND WORKPIECE MOUNTING MEMBER ATTACHED TO THE LAPPING JIG

BACKGROUND OF THE INVENTION

1. Field of the Invention

The present invention generally relates to the improvement of a lapping or polishing (hereinafter referred to as lapping) apparatus for lapping an ultra-precisely machined part (or component), a lapping jig for use in this apparatus and a workpiece mounting member which is used by being attached to this lapping jig.

2. Description of the Related Art

Hitherto, ultra-precisely machined parts, such as a magnetic head, have been required to have a finely machined surface, on which very few scratches are formed, in a final finishing step of putting a finishing touch to a surface of the magnetic head (an air bearing surface), which faces a medium. Thus, the air bearing surface is finally lapped by means of a lapping apparatus, which is designated as a lapping machine, by using industrial diamond abrasives, whose particle diameter is close to that of smallest industrially producible particles (namely, is not more than 1 $\mu$m), as polishing powder (or abrasive grains). Further, especially, in the case of producing a magneto-resistance effect type head (namely, MR head) to be used as a magnetic head for a hard disk device, the productivity of the head is enhanced by giving finishing touches to the heads, which are aligned like bars, in such a manner that the height of (MR) elements is established with accuracy of better than ±0.2 $\mu$m.

In the step of lapping such parts, there are the following demands:

(a) Stabilizing the height of MR element accurate.

(b) Stabilization of the machining quality at a level at which no scratches are formed on the surface of a workpiece.

(c) Increase in the working efficiency (namely, a reduction in the length of a preparation (or set-up) time other than a working time).

Generally, after being made on a wafer, together with terminals and a recording head portion by utilizing thin film technology, MR heads are cut and formed into a plurality of bars. Then, each of such bars is turned into a head by being machined and shaped into a slider after being lapped by a lapping apparatus. This head is mounted to a tip end portion of an arm of a head actuator.

A conventional electrical lapping guide (ELG) type lapping apparatus which has been placed on the market is provided with a lapping jig of the swinging type, which is placed on a lapping plate of the main unit of the apparatus and is adapted to be able to move from the inner circumferential portion of the lapping plate to the outer perimetric portion thereof. The bar is mounted on the bottom surface of this lapping plate. Slurry, which includes lapping powder composed of an industrial diamond abrasive, is supplied from a slurry supply unit onto the rotating lapping plate. The bar is lapped by swinging the lapping jig under such conditions.

Such a lapping jig is provided with a correction mechanism, for compensating for the lapping amount along the bar, such as, for example, a mechanism of pushing both end portions and the central portion of the bar. Accordingly, if the bar to be lapped has a warp or inclination against the rotating lapping plate, the warp or the inclination is corrected to be flat against the lapping plate by freely changing the push-out (or extruded) amounts corresponding to the lateral sides and the central portion of the bar. This correction mechanism is connected to a control unit which uses a computer and is adapted to operate in accordance with a correction signal sent from the control unit. Further, a piezoelectric device element may be placed in a transfer jig (namely, a workpiece mounting member) in which a bar is mounted, and moreover, the jig may be provided with a mechanism for correcting the warp of a bar by applying the voltage to this piezoelectric device from the control unit.

However, in the case that a bar of MR heads is lapped by the conventional lapping apparatus having a swinging mechanism, there occur the following problems:

(1) If there are slight unflatnesses, i.e., projections and depressions, formed in the radial direction on the top surface of the lapping plate, parts of the surface of the bar may be scraped by these projections and depressions with the result that irregularities may be formed on the surface of the bar. This problem is liable to occur, especially, when stopping the lapping. Further, the top surface of the lapping plate should be ultra-precisely made flat so as to enhance the flatness of the bar to be lapped. Thus, the conventional lapping apparatus has encountered the problem that the cost thereof, especially, the cost of a flattening mechanism (or facing apparatus) increases.

(2) Because the lapping jig is of the swinging type, a moment is applied to an end face of the bar when the swinging direction is changed after the bar moves to the innermost or outermost periphery of the lapping plate. Consequently, the end face of the bar or the surface of the lapping plate is apt to be damaged.

SUMMARY OF THE INVENTION

The present invention aims at solving the problems of such a conventional lapping apparatus.

Accordingly, an object of the present invention is to provide a lapping apparatus in which, even if projections and depressions (slight unflatness) are formed in the radial direction on the top surface of a lapping plate, there is no fear that the surface of a bar is damaged and further, no moment is applied to the end face of the bar when being lapped, namely, a lapping apparatus in which the bar and the lapping plate are hard to damage.

Further, another object of the present invention is to provide a lapping jig for use in such a lapping apparatus.

Moreover, still another object of the present invention is to provide a workpiece mounting member to be mounted in such a lapping jig.

To achieve the foregoing objects, in accordance with an aspect of the present invention, there is provided a lapping apparatus for lapping a workpiece mounted on a workpiece mounting member, which comprises: a lapping plate provided on an upper part of a main unit of the apparatus in such a manner as to be able to rotate; at least one lapping jig that has an attaching portion, to which the workpiece mounting member is attached, and is placed on the lapping plate; and a control unit for controlling the lapping jig, wherein the lapping jig is provided with: a lapping head adapted to be able to rotate in a direction on the lapping plate; and a motor for forcedly causing the lapping head to rotate stably, wherein, in addition to the workpiece mounting member, this lapping head further has: at least two dummy work materials composing a polished surface, together with the workpiece; lapping correction means for driving the workpiece according to a correction signal to thereby correct a lapped state of the workpiece; sensor means adapted to be able to convert a remaining untapped quantity of the workpiece; electrical connection means, which is provided at an end portion of a rotating shaft of the lapping head and is adapted to electrically connect the rotating shaft when being in a rotating state, with the control unit; and electrical wiring means for transmitting an electrical signal, which is sent from the sensor means, and a correction signal, which should be sent to the lapping correction means, by the electrical connection means through an inner portion of the rotating shaft of the lapping head, and wherein the control unit is adapted to output a correction signal according to an electrical signal, which is sent from the sensor means, to the lapping correction means through the electrical connection means and the electrical wiring means.

To achieve the foregoing objects, in accordance with another aspect of the present invention, there is provided a lapping jig placed on a lapping plate of a lapping apparatus, which comprises: a motor mounted on a main body of the jig; a lapping head that is attached to the main body through a rotating shaft and is caused by the motor to rotate in a direction on the lapping plate; a workpiece mounting member provided in this lapping head; at least two dummy work materials composing a polished surface, together with the workpiece; lapping correction means, which is provided in the lapping head, for driving the workpiece according to a correction signal to thereby correct a lapped state of the workpiece; sensor means adapted to be able to convert a remaining untapped quantity of the workpiece; electrical connection means, which is provided at an end portion of a rotating shaft of the lapping head and is adapted to electrically connect the rotating shaft when in a rotating state, with an exterior thereof; and electrical wiring means for transmitting an electrical signal, which is sent from the sensor means, and a correction signal, which should be sent to the lapping correction means, by the electrical connection means through an inner portion of the rotating shaft of the lapping head.

Furthermore, to attain the foregoing objects, in accordance with still another aspect of the present invention, there is provided a workpiece mounting member for mounting a workpiece, which is lapped on a lapping plate, on a lapping jig placed on the lapping plate. This workpiece mounting member comprises: a first mounting member which is attached to the lapping jig through a rotating shaft and causes a work member, which should be polished, to rotate with respect to the lapping plate to thereby regulate lateral inclination thereof; and a second mounting member that is securely fixed to the first mounting member and has a bottom surface, on which a workpiece is mounted, and has a function of partly changing the height of a mounting surface of said work member from the lapping plate by partly heating or cooling the second mounting member.

In this manner, in accordance with the present invention, a lapping jig adapted to rotate on the lapping apparatus is created. Further, the lapping jig rotates on the lapping plate. Thus, drive signals and lapping position signals for a lateral difference correction mechanism for correcting the difference between the stock removals in lapping, which correspond to the lateral sides of the workpiece, and the warp correcting mechanism are supplied to a rotating portion through a slip ring or the like. Furthermore, the lateral difference correction mechanism is configured by rotatably mounting the second mounting member on the first mounting member. Further, the rotation of the workpiece results in the imparting of torque to the left-hand and right-hand side portions of the workpiece. Thus, the lapping degree of the left-hand and right-hand side portions of the workpiece is regulated.

The warp correction mechanism has a frame structure, by which the height of the mounting surface of the workpiece from the lapping plate can be partly changed by controlling heat in the second mounting member constituted by the same member. Thus, by regulating heat applied to this frame structure, the mounting surface of the workpiece can be deformed in a direction which is opposite to the direction of the warp of the workpiece. Moreover, a surface of the workpiece can be lapped flatly by simultaneously preventing an occurrence of the warp thereof.

With such a configuration, the lateral difference correction mechanism for correcting the lateral difference in respect of stock removals, and the warp correction mechanism are realized in such a way as to have simple structures. Moreover, as a result of providing such correction mechanisms in the structure of a rotary type jig, a compact lapping apparatus, by which a polished workpiece is finished with high flatness, is realized.

BRIEF DESCRIPTION OF THE DRAWINGS

Other features, objects and advantages of the present invention will become apparent from the following description of preferred embodiments with reference to the drawings in which like reference characters designate like or corresponding parts throughout several views, and in which:

FIG. 12A is a table illustrating an example of a heater control operation according to a change in height of an ELG device in a lapping process which uses the transfer jig of the first embodiment of the present invention;

FIG. 12B is a table illustrating an example of an operation of controlling a solenoid according to the change in height of an ELG device in the lapping process which uses the transfer jig of the first embodiment of the present invention;

FIG. 16 is a partially-enlarged exploded perspective diagram showing the configuration of a transfer jig of a second embodiment to be attached to the lapping head of FIG. 5;

FIG. 20A is a table illustrating an example of a heater control operation according to a change in height of an ELG device in a lapping process which uses the transfer jig of the second embodiment of the present invention;

FIG. 20B is a table illustrating an example of an operation of controlling a solenoid according to the change in height of an ELG device in the lapping process which uses the transfer jig of the second embodiment of the present invention;

DETAILED DESCRIPTION OF THE PREFERRED EMBODIMENTS

Before describing the preferred embodiments of the present invention, a conventional method of manufacturing an MR head and a conventional lapping machine will be described by referring to FIGS. 1 and 2.

Figure 1:
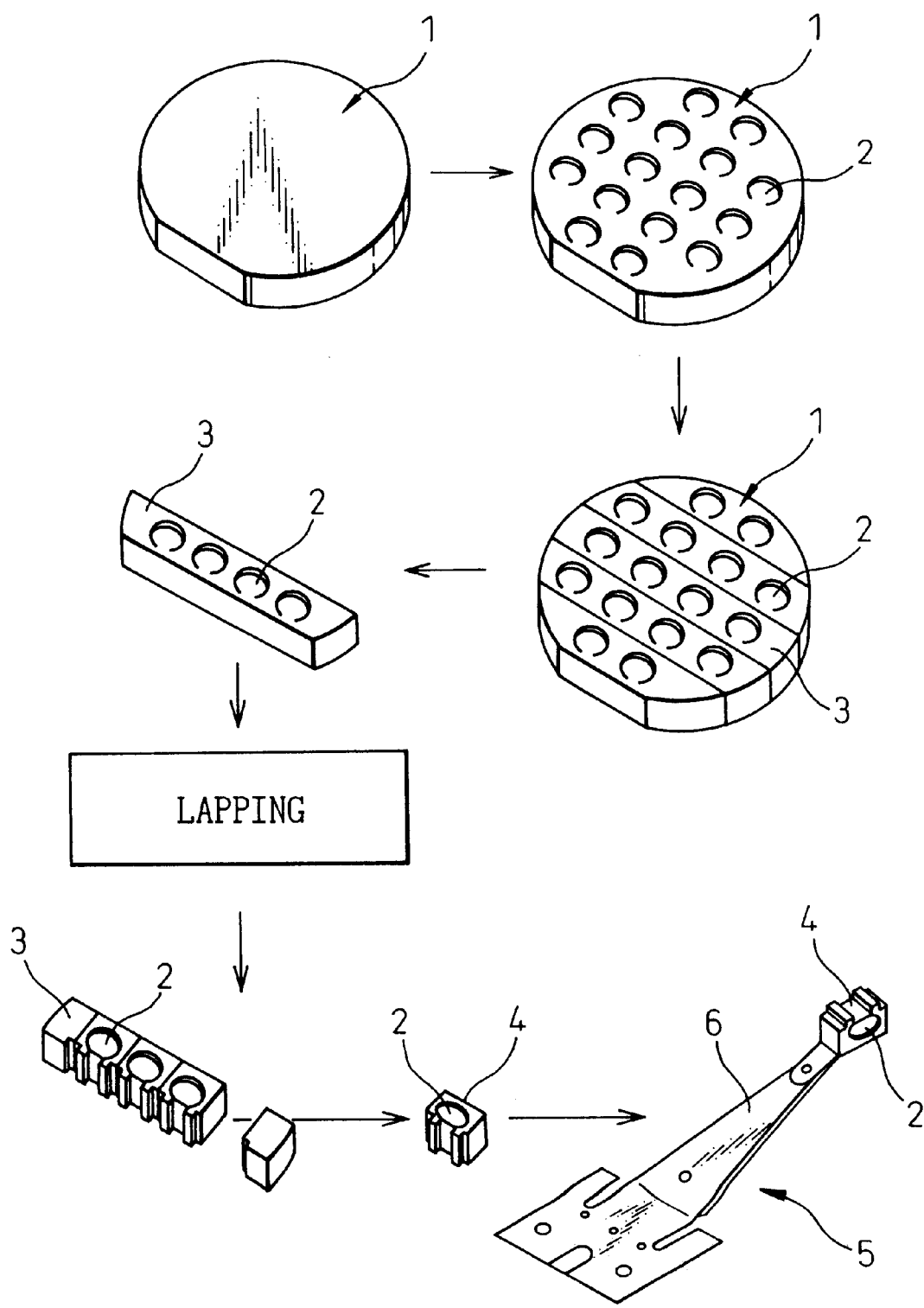
FIG. 1 is a process flow chart illustrating the manufacturing process of manufacturing a conventional MR head.

Generally, as shown in FIG. 1, MR heads 2 are cut and formed into a plurality of bars 3 after being made on a wafer 1 together with terminals and a recording head portion by utilizing thin film technologies. Then, each of such bars 3 is turned into a head 4 by being machined and shaped into a slider after lapped by a lapping apparatus. This head 4 is mounted to a top end portion of an arm 6 of a head actuator 5.

Figure 2:
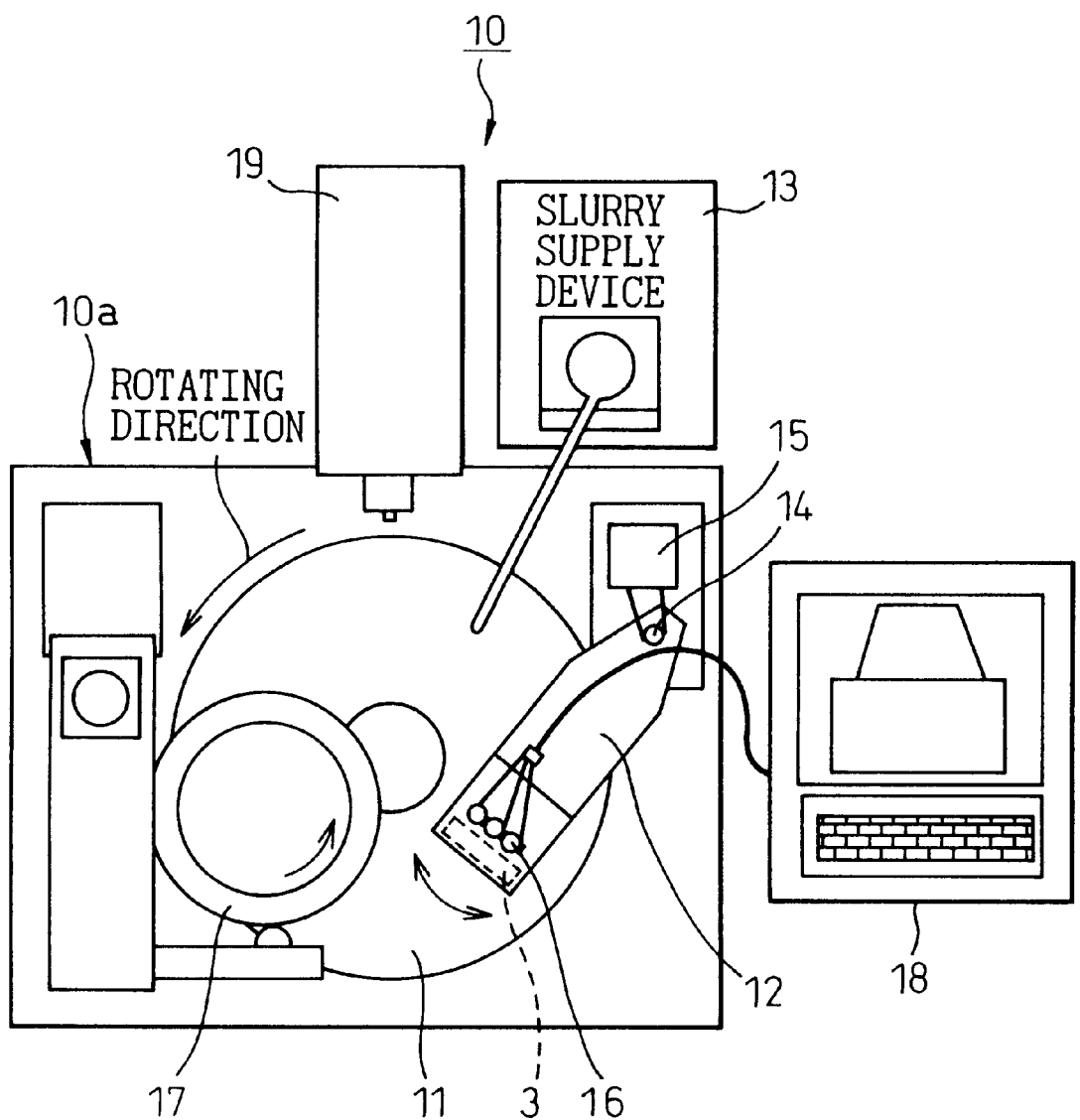
FIG. 2 is a plan view of a conventional lapping apparatus provided with a lapping mechanism of the swinging type.

As shown in FIG. 2, the conventional ELG type lapping apparatus 10 which has been placed on the market is provided with a lapping jig, of the swinging type, which is placed on a lapping plate of the main unit 10a of the apparatus and is adapted to be able to move from the inner portion of the lapping plate to the outer portion thereof. The bar 3 described with reference to FIG. 1 is mounted on the bottom surface of this lapping plate 11. Slurry, which includes lapping powder composed of industrial diamond abrasives, is supplied from a slurry supply device 13 onto the rotating lapping plate 11. The bar 3 is lapped by swinging the lapping jig 12 in such conditions. Reference numeral 14 designates a swing center of the lapping jig 12; 15 a swing mechanism; 17 a conditioning ring; and 19 a facing apparatus for flattening the top surface of the lapping plate 11.

Such a lapping jig 12 is provided with a correction mechanism 16 for correcting the lapping amount, which respectively corresponds to the lateral sides of the bar 3, for example, a mechanism of pushing the lateral end portions and the central portion of the bar 3. Further, the difference in lapping amount, which respectively corresponds to the lateral sides of the bar 3, is corrected by changing the push-out amounts respectively corresponds to the lateral sides and the central portion of the bar 3. This correction mechanism 16 is connected to a control unit 18 which uses a computer, and is adapted to operate in accordance with a correction signal sent from the control unit 18. Further, a piezoelectric device (not shown) may be placed in a transfer jig (namely, a workpiece mounting member) in which the bar 3 is mounted, and moreover, the jig may be provided with a mechanism for correcting the warp of a bar 3 by applying voltage to piezoelectric device from the control unit 18.

However, in the case that a bar 3 of MR heads is lapped by the conventional lapping apparatus having a swinging mechanism, there are the following problems:

(1) If there are slight unflatness (projections and depressions) formed in the radial direction on the top surface of the lapping plate 11, parts of the surface of the bar 3 may be scraped by these projections and depressions with the result that irregularities may be formed on the surface of the bar 3. This problem is liable to occur, especially, when stopping the lapping plate 11. Further, the top surface of the lapping plate 11 should be ultra-precisely made flat so as to improve the flatness of the bar 3 to be lapped. Thus, the conventional lapping apparatus has encountered the problem that the cost thereof, especially, the cost of the facing apparatus increases.

(2) Because the lapping jig 12 is of the swinging type, a moment is applied to an end face of the bar 3 when the swinging direction is changed after the bar 3 moves to the innermost or outermost periphery of the lapping plate 11. Consequently, the end face of the bar 3 or the surface of the lapping plate 11 is apt to be damaged.

Embodiments of the present invention, which solve such problems, will be described hereinbelow.

Figure 3:
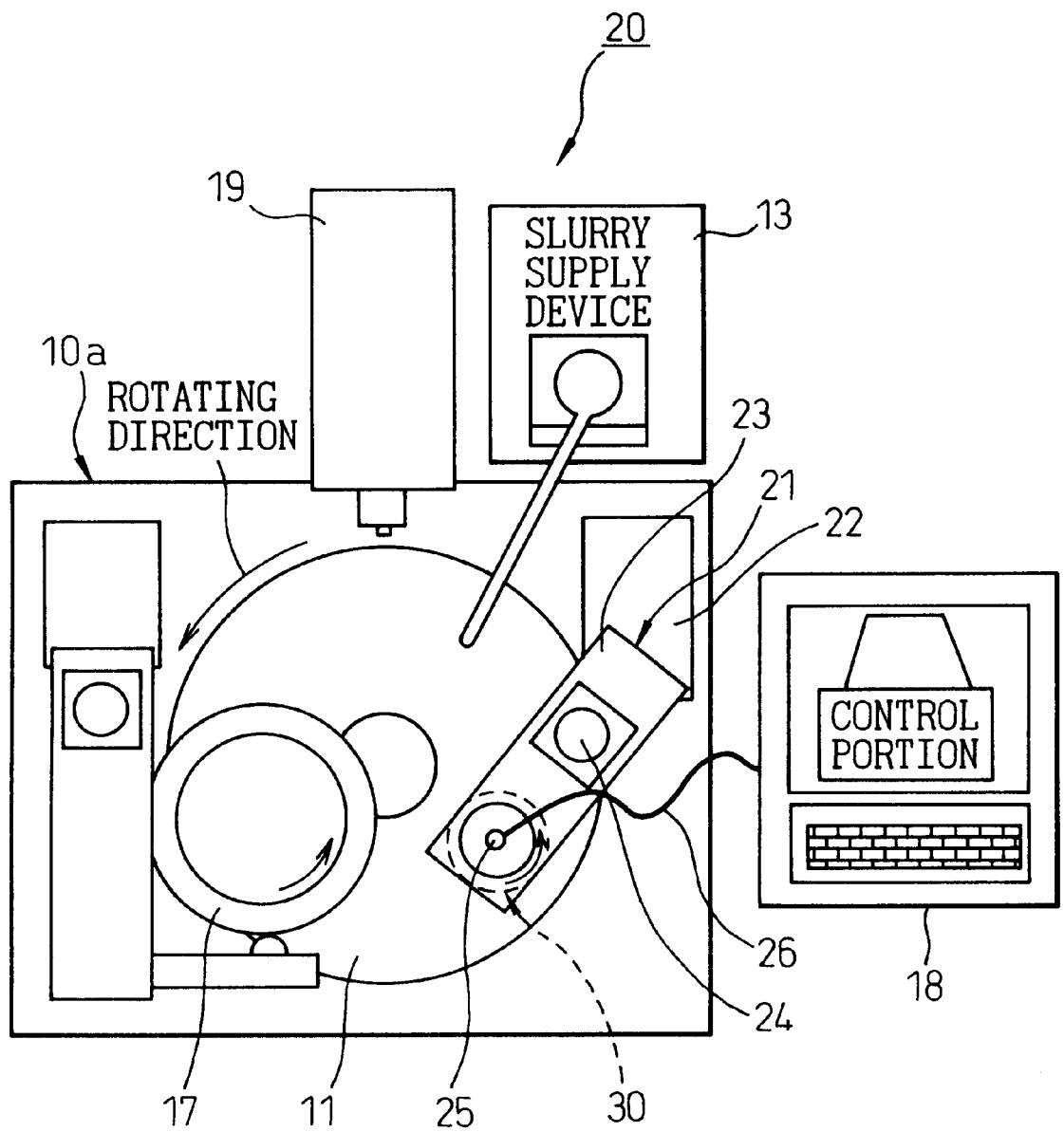
FIG. 3 is a plan view of an embodiment of the present invention, which is a lapping apparatus provided with a lapping mechanism of the rotary type.

FIG. 3 shows the configuration of a lapping machine 20 which is an embodiment of the present invention. Incidentally, in this figure, same reference numerals designate same composing members as of the conventional lapping apparatus 10.

Similarly, in this lapping apparatus 20, namely, in this embodiment of the present invention, a lapping plate 11 caused by a motor (not shown), which is provided in a lower portion of the main unit 10a, to perform a uniform rotating motion is provided on the top surface of a main unit 10a of the apparatus. A conditioning ring 17 for flattening the lapping surface of the lapping plate, and a flattening mechanism (namely, a facing apparatus) 19 for flattening the top surface of this lapping plate 11 are provided on this lapping plate 11. Lapping plate 11 is constructed so that metallic layers, which are made of metals, such as tin and copper, and are of 10 to 30 mm in thickness, are stacked on or stuck onto a plate (or base) made of stainless steel or cast-iron. Further, the apparatus is adapted so that slurry containing polishing powder made of industrial diamond is supplied from a slurry supply device 13 onto this lapping plate 11.

On the other hand, a lapping jig 21 of this embodiment to be placed on the lapping plate 11 of the lapping apparatus 20 is composed of a base 22 and an arm 23. Further, a lapping head 30 and a motor 24 for causing this lapping head 30 to rotate at a uniform rotating speed are provided on the arm 23. The lapping head 30 rotates around a rotating shaft thereof. Slip ring 25 serving as electrical connection means is mounted onto an upper portion of the rotating shaft. The lapping head 30 is connected to the control unit 18 through the slip ring 25 and a connection cord 26. Signals taken out of the lapping head 30 are inputted to the control unit 18. In addition, control signals outputted from the control unit 18 are transmitted to the lapping head 30.

Incidentally, the arm 23 of the lapping jig 21 may be fixed to the base 22. Alternatively, the lapping head 30 may be adapted to move from an inner portion to an outer portion of the lapping plate 11 by providing a swinging mechanism in the base 22 and swinging the arm 23 on the lapping plate 11. In this case, the entire surface of the lapping surface of the lapping plate 11 can be used effectively. Thus, the life of the lapping plate 11 is lengthened.

Figure 4:
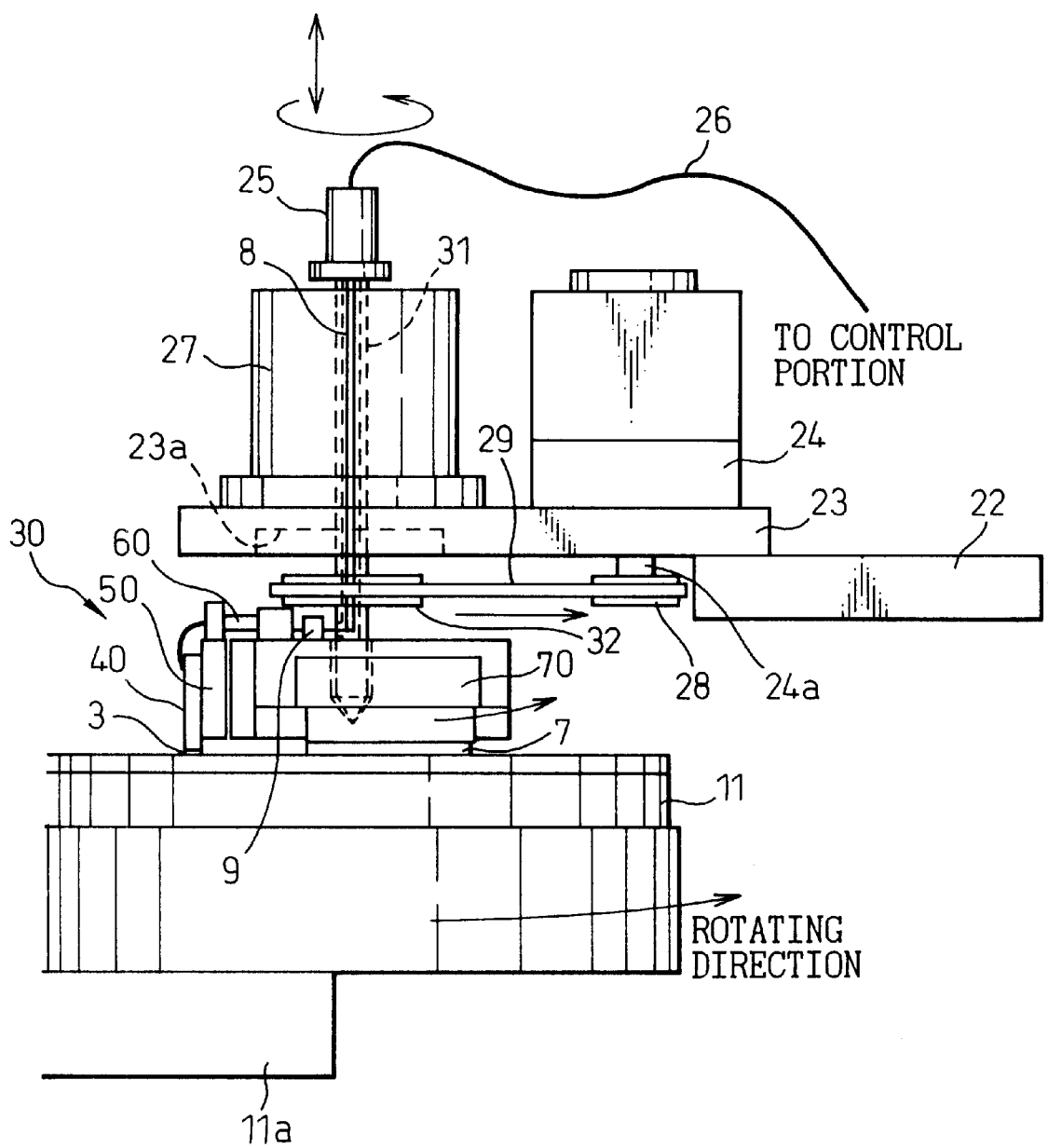
FIG. 4 is a partially enlarged side diagram showing the configuration of a primary part of the lapping apparatus of FIG. 3.

FIG. 4 shows the configuration of the arm 23 of the lapping jig 21 of FIG. 3. The arm 23 is placed on the lapping plate 11 to be rotated by a spindle motor 11a. Motor 24 for forcibly rotating the lapping head 30, and a bearing case 27 containing bearings, through which the rotating shaft 30 of the lapping head 30 are supported, are provided on the arm 23 that is provided on the base 22. A pulley 32 is provided under the arm 23 of the rotating shaft 31. Further, a pulley 28 is mounted on a rotating shaft 24a of the motor 24. Moreover, a belt 29 is looped over the pulleys 28 and 32. Thus, when the motor 24 runs, the rotating shaft 31 is rotated by the belt 29 looped over the pulleys 28 and 32.

Furthermore, the rotating shaft 31 can rotate through the bearings contained in the bearing case 27 and can be moved upwardly or downwardly by a predetermined distance. Further, a depressed portion 23a is provided in the bottom surface portion of the arm 23, through which the rotating shaft 31 penetrates, in such a manner that the rotating shaft 31 can be raised by the predetermined distance. Moreover, the bottom end portion of the rotating shaft 31 is formed like a pivot (to be described later). Thereby, the lapping head 30 can be detached from and attached to the rotating shaft 31.

The lapping head 30 rotated by the rotating shaft 31 has a transfer jig 40, which acts as a workpiece mounting member for mounting a bar 3 that is a workpiece (namely, an object to be lapped), and a mounting member 50 therefor, and further has a dummy workpiece 7 and a mounting member 70 therefor. Incidentally, it is assumed that for example, an MR head is formed and incorporated into the bar 3. Furthermore, a lapping correction mechanism 60 is provided between the mounting member 50 for mounting the transfer jig 40, and the lapping head 30. The height of the dummy workpieces 7 with respect to the lapping plate 11 can be adjusted by using micrometers (not shown) provided in the mounting members 70, respectively.

A signal inputted to the lapping correction mechanism 60 and a signal outputted from a lapping state detecting sensor (to be described later), which is provided in the bar 3, are led to the slip ring 25 of the shaft-end type provided in the upper portion of the rotating shaft 31 through an electrical wire 8 wired in a hollow portion in the hollow rotating shaft 31, and are connected to a control unit (not shown) through this slip ring 25 by using a connection cord 26. Incidentally, as above described, the lapping head 30 can be detached from the rotating shaft 31, so that a connector 9 is provided at a midpoint in the electrical wire 8.

The slip ring 25 is operative to electrically connect the rotating body with a stationary portion and is provided with a rotating electrode, which is connected with the rotating shaft 31 and is adapted to rotate, and a fixed electrode electrically connected to this rotating electrode. In the case of this embodiment, the electrical wire 8 is connected to the rotating electrode, while the connection cord 26 is connected to the fixed electrode. In the case of this embodiment, the number of necessary electrodes are at least six in each case of the rotating electrode and the fixed electrode. Additionally, the connection means between the electrical wire 8 and the connection cord 26 is not limited to the slip ring 25 of the shaft-end type but may be, for instance, a slip ring of the shaft with hollow core type provided on the upper portion of the pulley 32.

Further, driving power for a displacement mechanism of displacing the lapping correction mechanism 60 and the transfer jig 40 is supplied through the slip ring 25. The detected lapping position signal may be wirelessly transmitted to the control unit. Furthermore, for example, a power coupler for transmitting a signal between non-contact electrodes from one of these electrodes to the other electrode by using an induced current can be used in such a manner as to face the top surface of the rotating shaft 31. Moreover, the driving power for the displacement mechanism corresponding to each of the lapping correction mechanism 60 and the transfer jig 40 may be held on the lapping head 30 as a battery.

In the case of this embodiment, the following signals are taken out of the lapping head 30:

(1) A signal for reading a change in removal depth of the bar 3, more particularly, for reading a change in removal depth corresponding to each of at least three places, namely, both lateral side positions and the central position on the bar 3.

(2) A drive signal for the lapping difference correction mechanism 60 to correct the lateral inclination of the bar 3.

(3) A drive signal for the displacement mechanism of correcting the warp of the bar 3.

Incidentally, the signal for reading a change in removal depth of the bar 3, which is described above in the item (1), may be adapted to represent a resistance value that is obtained by preliminarily embedding a resistance pattern in the bar 3 and increases with the progression of the lapping. Further, the signal for reading a change in removal depth corresponding to each of the three places on the bar 3 is sent to the control unit 18 (see FIG. 3) through the electrical wire 8, the slip ring 25, and the connection cord 26. The control unit 18 is constituted by, for example, a computer and is operative to analyze the detected lapping position data and to detect the difference in stock removal between the lateral sides of the bar 3 and the degree of the warp thereof. Moreover, the control unit 18 outputs a signal, which is used for correcting the difference in stock removal between the lateral sides, to the lapping difference correction mechanism 60, and further outputs a drive signal, which is used for instructing the correction mechanism to correct the warp of the bar 3, to the mechanism for correcting the warp thereof.

Figure 5A:
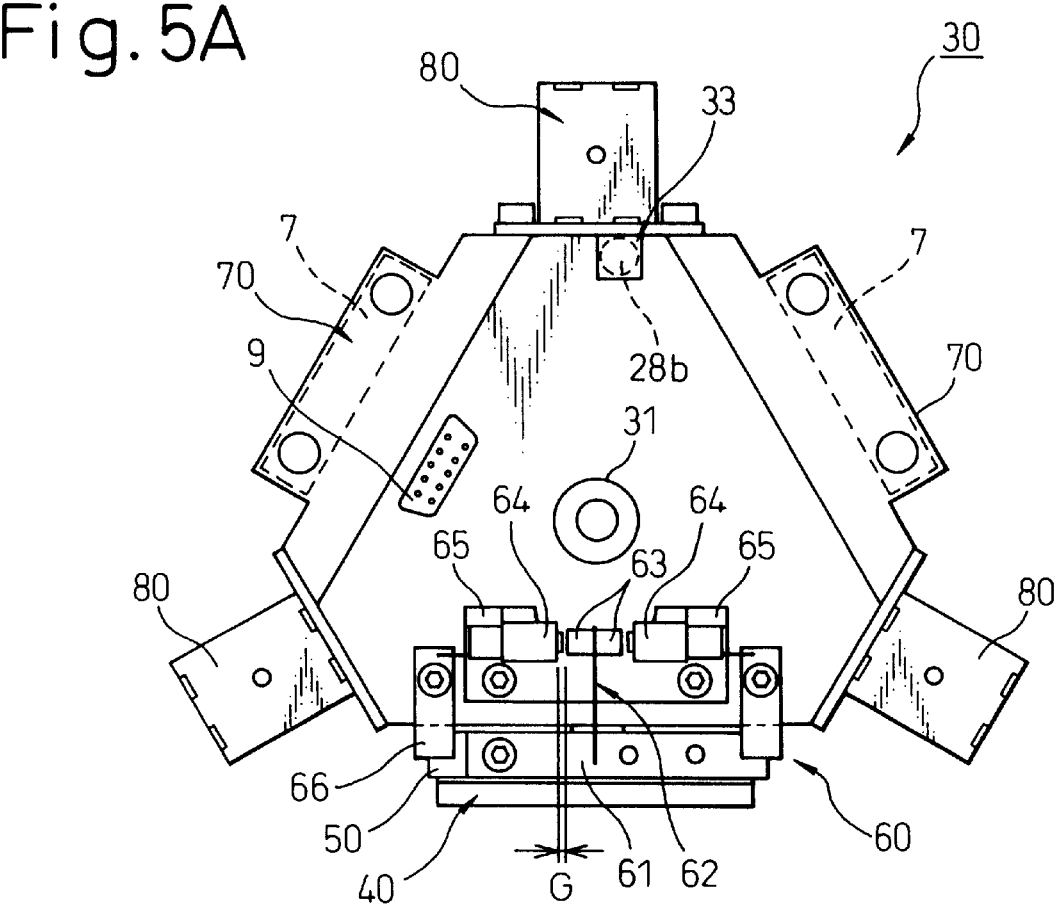
FIG. 5A is a plan view of a lapping head to be mounted in a lapping jig provided in the lapping apparatus of FIG. 3.
Figure 5B:
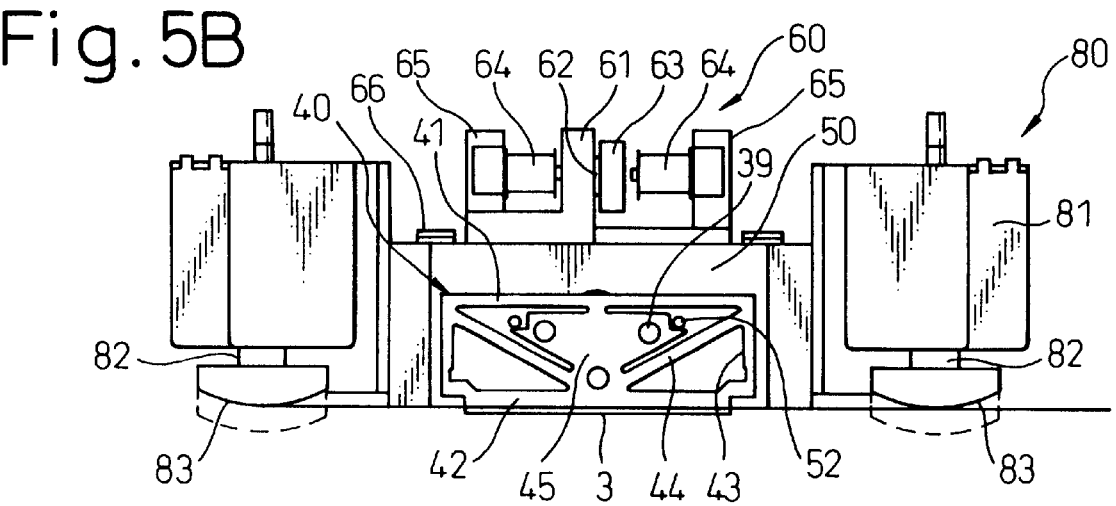
FIG. 5B is a side view of the lapping head of FIG. 5A, to which the transfer jig is attached.

FIGS. 5A and 5B are a plan diagram and a side diagram showing the configuration of the lapping head 30, respectively. The lapping head 30, whose horizontal section is nearly triangular, has the rotating shaft 31 at the central portion thereof and further has the connector 9 and a hole 33 into which a push rod 28b for pushing this lapping head 30 is put. The transfer jig 40, to which the bar 3 is attached, and the mounting member 50 therefor are provided on one of the three sides of the lapping head 30. Moreover, the dummy workpieces 7 and the members 70 therefor are provided on the remaining two sides of the lapping head 30, respectively. Furthermore, the lapping correction mechanism 60 is provided between the mounting member 50, which is used for mounting the transfer jig 40, and the lapping head 30. Additionally, a lapping stop mechanism 80 for stopping the lapping of the bar 3 and the dummy workpiece 7 by means of the lapping head 30 is provided at each vertex portion of the triangular lapping head 30.

The reason why the horizontal section of the lapping head 30 has the shape of a triangle having one side, to which the bar 3 is attached, and the other two sides, to which the dummy workpieces 7 are attached, is the stabilization of the lapping surface by utilizing three-point support. However, the shape of the horizontal section of the lapping head 30 is not limited to a triangle but may be a quadrangle or another shape. Further, it is preferable for preventing the abrasion of the dummy workpiece 7 to form the dummy workpiece 7 so that the lapping area thereof to be polished is somewhat larger than that of the bar 3. Moreover, for the purpose of adjusting the height of the lapping surface of the dummy workpiece 7, a member for adjusting the dummy workpiece 7, for instance, a micrometer may be provided on the top surface of the mounting member 7.

The lapping stopping mechanism 80 consists of, for example, a solenoid 81 and a plunger 82, which is adapted to go into and out of the solenoid 81, as shown in FIG. 5B. Pad 83 is provided at the distal end of the plunger 82. Usually, the plunger 82 is sunk in the solenoid 81. In such a case, the height of the pad 83 positioned at the end of the solenoid 81 from the lapping plate 11 is higher than the height of each of the bar 3 and the dummy workpiece 7 from the plate 11. Therefore, in the usual condition, the pad 83 provided at the distal end of the plunger 82 is prevented from being lapped or polished by the lapping plate 11. Then, when the solenoid 81 is supplied with voltage, the plunger 82 is projected from the solenoid 81, so that the pad 82 is pressed against the lapping plate 11 and that the lapping head 30 is pushed up from the plate 11. In this state, the pads 83 respectively provided at the end portions of the three plungers 82 come into contact with the lapping plate 11. Thus, the bar 3 and the dummy workpiece 7 are prevented from being lapped or polished by the lapping plate 11. Supplying voltage to this solenoid 81 is performed by the control unit 18 through the aforementioned electrical wire 8 and the aforementioned connection cord 26.

Figure 6:
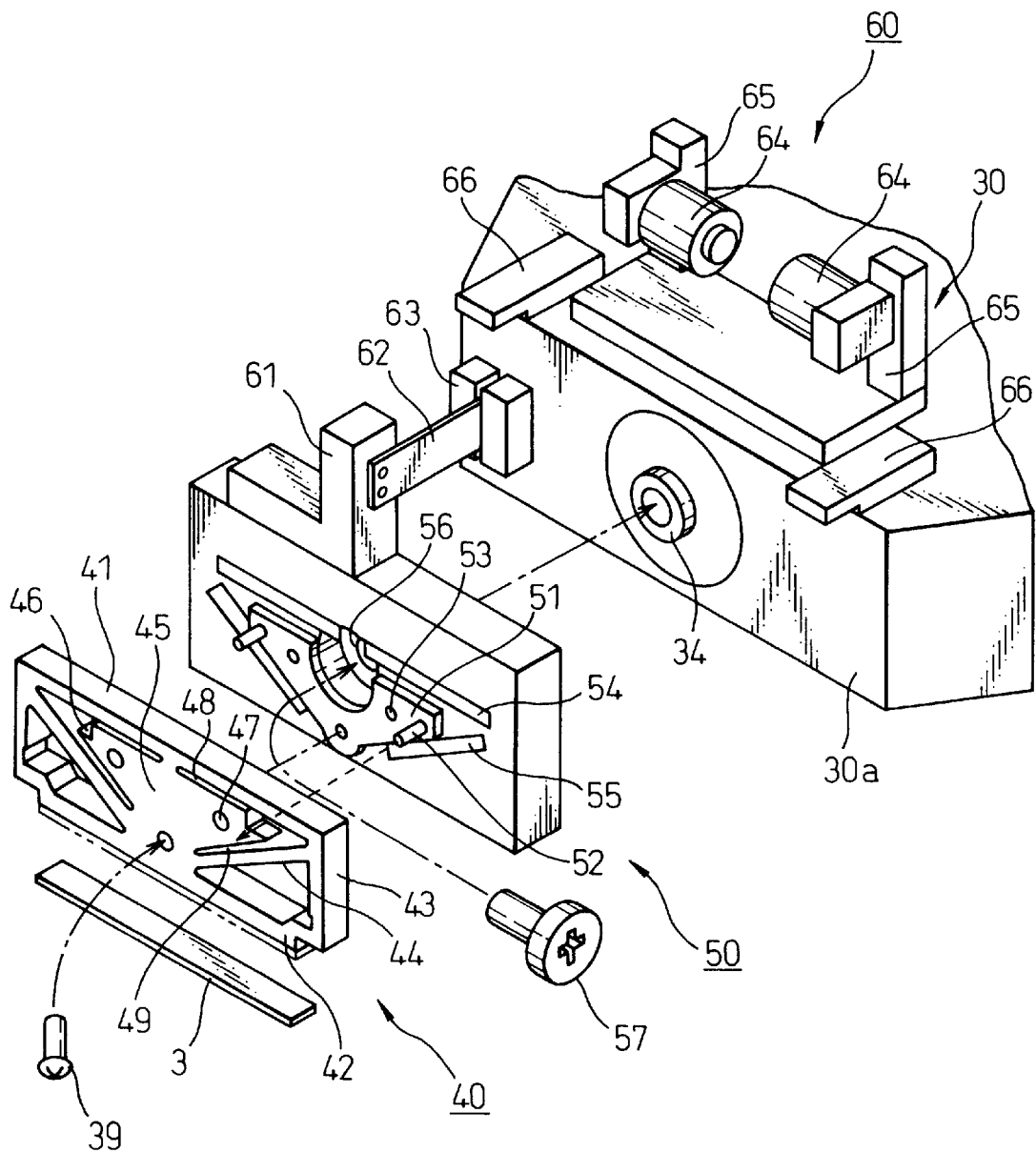
FIG. 6 is a partially-enlarged exploded perspective diagram showing the configuration of the transfer jig of a first embodiment of the present invention to be attached to the lapping head of FIG. 5B.

Hereinafter, the configuration of the transfer jig 40 and the mounting member 50 therefor in the first embodiment of the present invention and the configuration of the lapping correction mechanism therein will be described by referring to FIG. 6.

The transfer jig 40 of the first embodiment has a rectangular frame structure made of metal or ceramic, which are materials that expand and contract on being heated and cooled. Further, the transfer jig 40 is provided with an upper frame 41, a lower frame 42 on the bottom surface of which the bar 3 is provided, and lateral side frames 43. Moreover, each of the lateral side portions of the upper frame 41 is connected with the middle point of the lower frame 42 by using a corresponding one of two oblique frames 44. Furthermore, a center frame 45 connecting the midpoint of the upper frame 41 with the midpoint of the lower frame 42 extends laterally, in a portion which is defined by the oblique frames 44 (and the upper frame 41), in such a manner as to be along the oblique frames and to be set apart from the frames 41, 42 and 44 by grooves 48 and 49. Thus, the center frame 45 is shaped like a triangle.

Positioning depression portions 46 are formed on the lateral side end portions of the center frame 45. Further, mounting holes 47 are bored in three places in the central portion of the frame 45. Further, the grooves 48 and 49 are formed between the center frame 45 and one of the oblique frames 44 and between the frame 45 and the other oblique frame 44, respectively. This aims at preventing the displacement of each of the upper frame 41 and the oblique frames 44 from being obstructed by the center frame 45. The bar 3 is stuck onto the bottom surface of the lower frame 42 of such a transfer jig 40.

The outward form of the mounting member 50 for mounting the transfer jig 40 in the first embodiment is a rectangular prism which is larger than the transfer jig 40. Mounting base 51 is mounted at a place where the transfer jig 40 overlaps with the center frame 45. This mounting base 51 has positioning pins 52 which are projected at both end portions thereof and are inserted into positioning depression portions 46, respectively. Moreover, mounting holes 53 are bored therein at positions corresponding to mounting hole 47 for the transfer jig 47. The transfer jig 40 is fixed to the mounting member 50 by using screws 39 through the mounting holes 47 and 53 after positioned by inserting the positioning pins 52 into the positioning depression portions 46, respectively.

In the state that the transfer jig 40 of the first embodiment is fixed in the mounting member 50, the bar 3 stuck onto the bottom surface of the lower frame 42 of the transfer jig 40 protrudes downwardly from the bottom surface of the mounting member 50, as shown in FIG. 5B.

Further, in the case of this embodiment, heaters 54 and 55 for heating the upper frame 41 and the oblique frames 44 are provided at places on the mounting member 40, which respectively face the upper frame 41 and the oblique frames 44 of the transfer jig 40. Moreover, the mounting hole 56 is provided in the central portion of the mounting member 50. The mounting member 50 is fixed on the rotating shaft 34, which is provided on a side surface 30*a* of the lapping head 30, by using a screw 57 inserted into this mounting hole 45.

Figure 7:
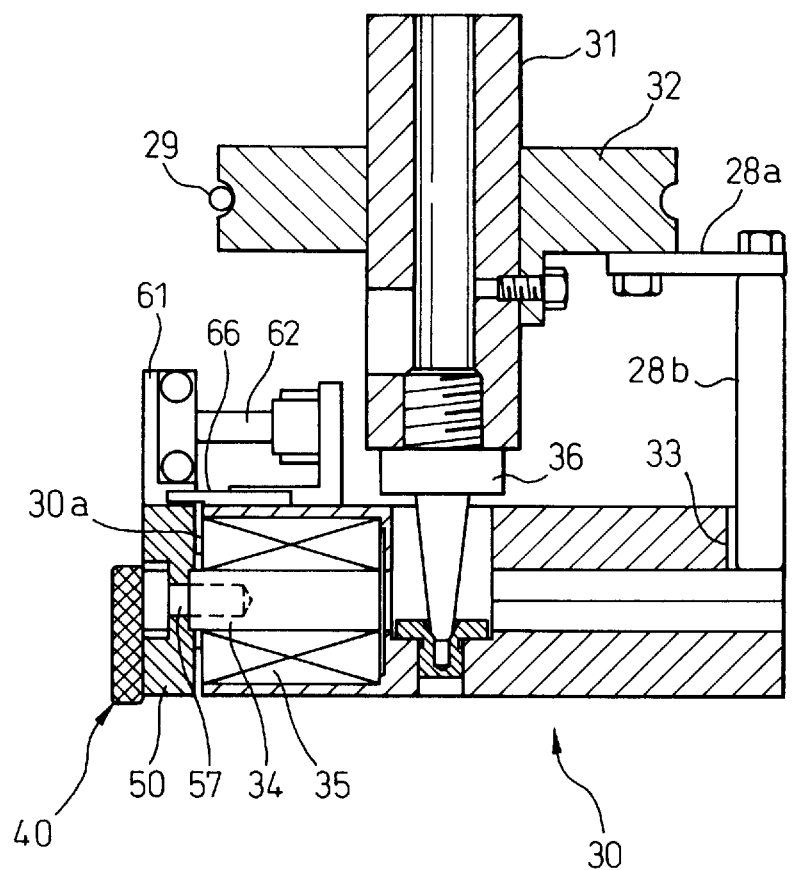
FIG. 7 is a partially-enlarged sectional diagram showing the configuration of a rotational mechanism portion of FIG. 4.

As shown in FIG. 7, the rotating shaft 34 is rotatably journaled in the bearing 35 which is embedded in the lapping head 30. Thus, the mounting member 50 is rotatably mounted on the single side surface 30*a* of the lapping head 30. On the other hand, a pivot 36 is provided between the lapping head 30 and the rotating shaft 31. The rotating shaft 31 and the rotating head 30 can be separated from each other by using this pivot 36. When separating the rotating head 30 from the rotating shaft 31, the rotating shaft 31 has only to be raised by a constant predetermined distance. Further, as described by referring to FIG. 5A, the transmission of rotation of the rotating shaft 31 to the lapping head 30 is performed by engaging the push rod 28*b* with the hole 33 in the lapping head 30. The push rod 28*b* is securely fixed to an end portion of the pulley 32 mounted on the rotating shaft 31 through the arm 28*a*. Therefore, when the pulley 32 is rotated by the belt 29, the push rod 28*b* rotates, so that the lapping head 30, which engages the push rod 28*b* at the hole 33, rotates.

The lapping correction mechanism 60 is operative to correct the lateral turning of this mounting member 50. As shown in FIG. 6, the lapping correction mechanism 60 consists of: a post 61 provided on the top surface of the mounting member 50; a plate spring 62 whose base portion is attached to the post 61; iron pieces 63 mounted on both sides of the end portion of the plate spring 62, respectively; two solenoids 64 provided on the top surface of the lapping head 30 through supports 65; and a stopper 66.

When mounting the mounting member 50 on the rotating shaft 34 by using the screw 57, the iron pieces 63 are placed in such a way as to be separated from each other by a gap G of 1 mm or so between the two solenoids 64. Further, the stoppers 66 are provided in such a manner as to regulate the positions of the top surfaces of both end portions of the mounting member 50. In the condition that the mounting member 50 is mounted on the rotating shaft 34, there is a predetermined gap between the bottom surface of the stopper 66 and the top surface of the mounting member 50. Signal input terminals of the solenoids 64 are connected to the connector 9 illustrated in FIG. 5A.

In the case of the lapping correction mechanism 60, when energizing one of the solenoids 64, the energized solenoid 64 attracts the iron piece 63. Then, the plate spring 62 having the iron piece 63 at the end portion thereof warps. As a result, a force (or torque) causing the mounting member 50 to rotate is generated.

Figure 8:
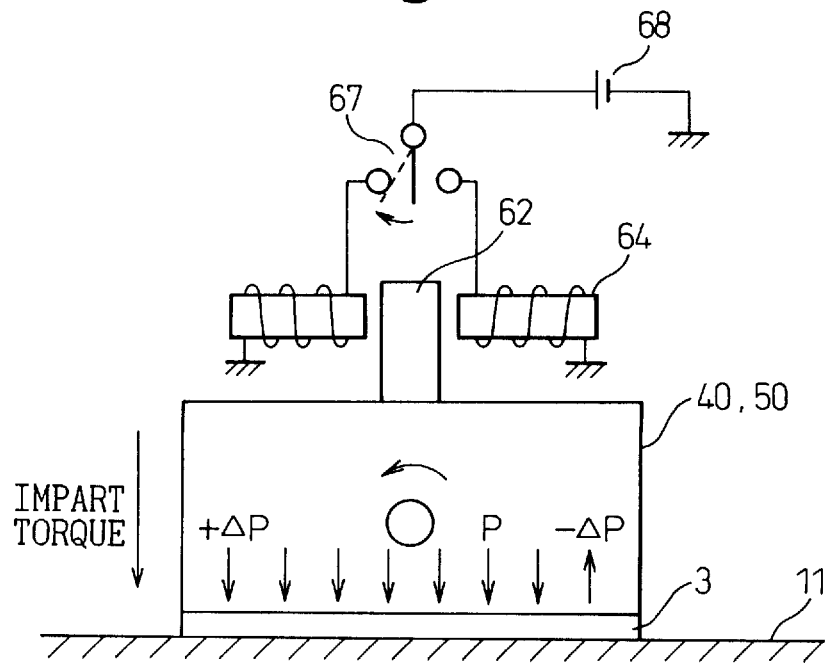
FIG. 8 is an explanatory diagram illustrating the operating principle of the lateral difference correction mechanism of the present invention.

FIG. 8 illustrates an operating principle of the lapping correction mechanism 60. When a battery 68 causes electrical current to flow through one of the solenoids 64 by setting a switch 67 in the position indicated by a dashed line, the plate spring 62 warps or bends to the side of the energized solenoid 64. The warpage of this plate spring 62 causes the mounting member 50 to rotate, so that torque is imparted to the left or right side thereof. This results in an increase in a pushing force to be applied onto the lapping plate 11 of the bar 3 that is stuck onto the bottom surface of the transfer jig 40 at the side to which the torque is imparted. In contrast, a pushing force corresponding to the other side decreases. Consequently, the amount of lapping is changed.

The difference in lapping amount between both sides of the bar is given by the following equation:

$$S=(P+\Delta P)\times \underline{a} \div (P-\Delta P)$$

where $0<\underline{a}\leq 1$; P designates a lapping constant pressure when making no correction; K is a constant; S is a ratio of the removal depth of the left-hand side of the bar 3 to that of the right-hand side thereof; and ΔP is a change in lapping pressure applied to the left-hand and right-hand portions, which is caused by imparting the torque.

Therefore, ΔP should be smaller than P. Moreover, the degree of the improvement of the difference in stock removal between the left-side and right-side portions of the bar 3 increases with an increase in ΔP in such a range of the value of ΔP. Incidentally, if the effect of the improvement is too great, the time required to improve the difference in stock removal between the left-side and right-side portions of the bar 3 becomes too short. Thus, the control of the correction of the difference in stock removal therebetween becomes difficult. Therefore, in view of the control ability of the control unit, it is desirable that the value of S is established as being not less than 2 and being not more than 5.

Further, in the case of the aforementioned embodiment, the lapping correction mechanism 60 is incorporated into the rotatable lapping head 30. However, the lapping correction mechanism 60 of this embodiment may be provided in the lapping jig of the conventional swinging type.

Moreover, in addition to the solenoids 64, displacement means using a linear actuator (namely, an automatic micrometer) and electromagnetic solenoid drive means may be employed as the means for causing a displacement of the plate spring 82. Furthermore, the attachment of the lapping head 30 to the rotating shaft 31 and the detachment of the lapping head 30 from the rotating shaft 31 are facilitated by further providing a second stopper 66, which is used for preventing the rotatable mounting member 50 from excessively rotating, therein.

Figure 9A:
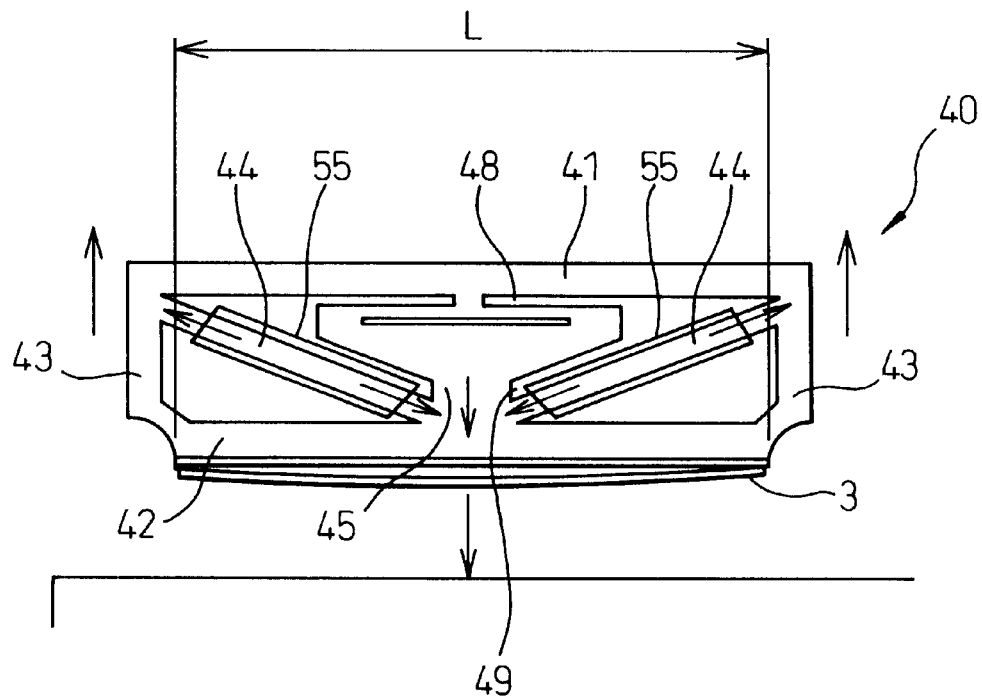
FIG. 9A is an explanatory diagram illustrating the configuration of the transfer jig of the first embodiment of the present invention and a projecting operation of the central portion thereof.
Figure 9B:
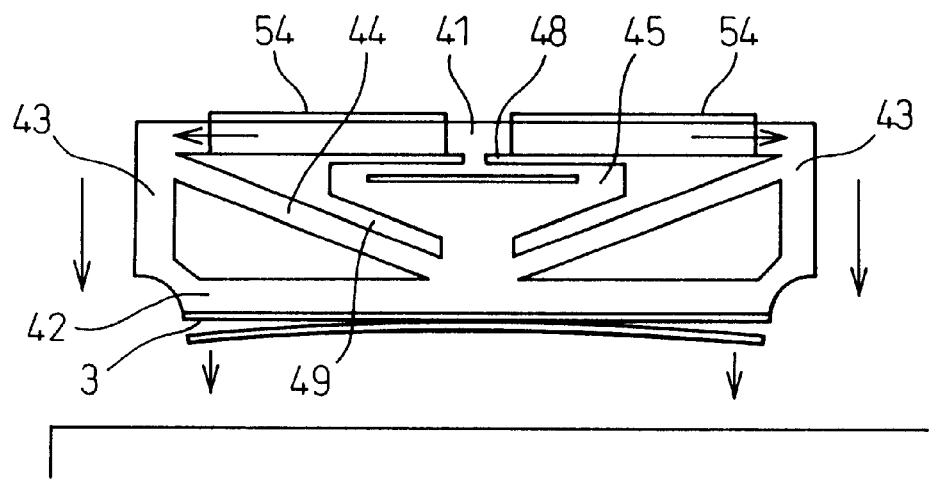
FIG. 9B is an explanatory diagram illustrating the configuration of the transfer jig of the first embodiment of the present invention and a caving operation of the central portion thereof.

Next, the correction mechanism in the case, in which the bar 3 stuck onto the transfer jig 40 of the first embodiment constructed as above described warps, will be described by referring to FIGS. 9A and 9B. Incidentally, the total length L of the bar 3 stuck onto the transfer jig 40 is 3 to 7 cm or so.

As described with reference to FIG. 6, the transfer jig 40 is composed of: the upper frame 41; the lower frame 42 having the bottom surface on which the bar 3 is mounted; the left-hand and right-hand side frames 43; the two frames 44 connecting both end portions of the upper frame 41 with the middle point of the lower frame 42; and the center frame 45, which is shaped like a triangle and is operative to connect the middle point of the upper frame 41 with the middle point of the lower frame 42. Furthermore, the transfer jig 40 is adapted so that only the center frame 45 is fixed to the mounting member 50 and that the other portions thereof can freely deform. In the condition that the transfer jig 40 is fixed to the mounting member 50, the bar 3 stuck onto the bottom surface of the lower frame 42 of the transfer jig 40 projects from the bottom surface of the mounting member 50.

In the case of this embodiment, the transfer jig 40 configured as described above is made of metals or ceramics and is formed into one piece. Further, the heater 54 is provided between the upper frame 41 and the mounting member 50. Moreover, the heater 55 is provided between the oblique frame 44 and the mounting member 50. Although a linear or plate-like heating wire is usually used in this heater, other heat sources or cooling means, such as a Peltier element, may be employed in place of such a heating wire.

First, consider the case that the bar 3 stuck onto the lower frame 42 has an upwardly convex warp. In this case, the heater 55 provided between the oblique frame 44 and the mounting member 50 is energized. Thus, the temperature of the heater 55 rises. Then, only the oblique frame 44 overlapping with the heater 55 is heated and thus expands in a direction indicated by an arrow in FIG. 9A. The other portions or frames do not expand. At that time, due to the presence of the groove 49, the displacement of the oblique frame 44 is not obstructed by the center frame 45. As a consequence, the left-hand and right-hand side frames 43 are pushed up by the oblique frames 44, respectively. Furthermore, the center frame 45 is pushed down by the oblique frames 44. Thus, the bar 3 stuck onto the lower frame 42 is bent in such a manner that the central portion thereof protrudes downwardly. Consequently, the upwardly convex warp of the bar 3 is corrected.

Next, consider the case that the bar 3 stuck onto the lower frame 42 has an downwardly convex warp. In this case, the heater 54 provided between the upper frame 41 and the mounting member 50 is energized. Thus, the temperature of the heater 54 rises. Then, only the upper frame 41 overlapping with the heater 54 is heated and thus expands in a direction indicated by an arrow in FIG. 9B. The other portions or frames do not expand. At that time, due to the presence of the groove 48, the displacement of the upper frame 41 is not obstructed by the center frame 45. As a result, the left-hand and right-hand side frames 43 are pushed down by the upper frame 41. Thus, the bar 3 stuck onto the lower frame 42 is bent in such a manner that both of the side end portions thereof protrude downwardly. Consequently, the downwardly convex warp of the bar 3 is corrected.

Further, in order to prevent the enlargement of the displacement of the transfer jig 40 and the transmission of the heat from the heater, notches may be formed in both end portions of parts of the upper frame 41 or the oblique frame 44, which face the heaters 55 and 54, respectively. Further, an amount of a warp of the bar 3 in the case of using the transfer jig 40 changes in proportion to the heating value (wattage) of the heater and thus the proportional control thereof can be performed.

Figure 10A:
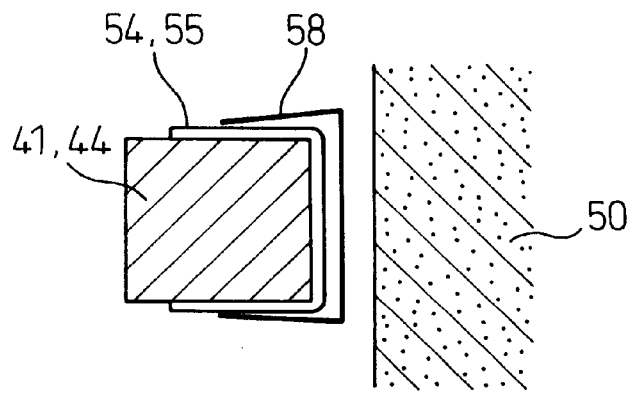
FIG. 10A is a partially-enlarged sectional diagram showing the configuration of a thin film heater to be used by being attached directly to the mounting member of the transfer jig of the present invention.

Incidentally, the heaters 54 and 55 may be constructed as follows:

(1) In the cases of attaching the heaters directly to the upper frame and the oblique frame:

In this case, as illustrated in FIG. 10A, the thin film heaters 54 and 55 are wound around the sides of the upper frame 41 and the oblique frame 44 and are fixed by the pushing spring 58. The thin film heaters 54 and 55 may be constituted by FPC (Flexible Printed Cable) made of copper or nichrome. Alternatively, such a thin film heater may be constituted by sandwiching a metallic foil between insulating materials.

Conductor patterns of the thin film heaters 54 and 55 may be copper patterns or nichrome patterns. Furthermore, the heaters 54 and 55 may be formed by winding nichrome wires around the sides of the upper frame 41 and the oblique frame 44.

Figure 10B:
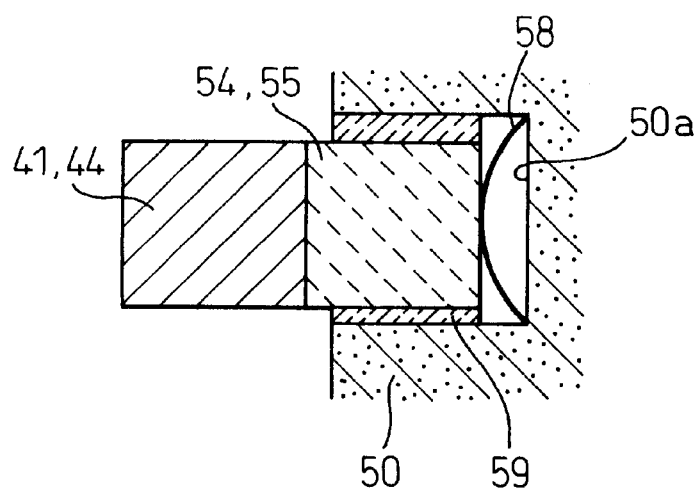
FIG. 10B is a partially-enlarged sectional diagram showing the configuration of a solid heater to be used by being attached to the mounting member side of the transfer jig employed in the apparatus of the present invention.

(2) In the case of attaching the heaters to the mounting members respectively facing the upper frame and the oblique frames:

In this case, as illustrated in FIG. 10B, the concave portion 50a is formed in a side portion of the mounting member 50 facing the upper frame 41 and the oblique frame 44. Further, square-bar-shaped ceramic heaters 54 and 55 are inserted into the concave portion 50a and are then pushed by the pushing spring 58 against the upper frame 41 and the oblique frame 44 slightly. At that time, only the places which are intended to be heated on the ceramic heaters 54 and 55, should be heated. It is, therefore, preferable for preventing heat from being transmitted to the other places, that the contact surfaces or areas other than the places to be heated are covered with adiabatic materials or members 59, or that air gaps are formed in the areas other than the places to be heated.

Figure 10C:
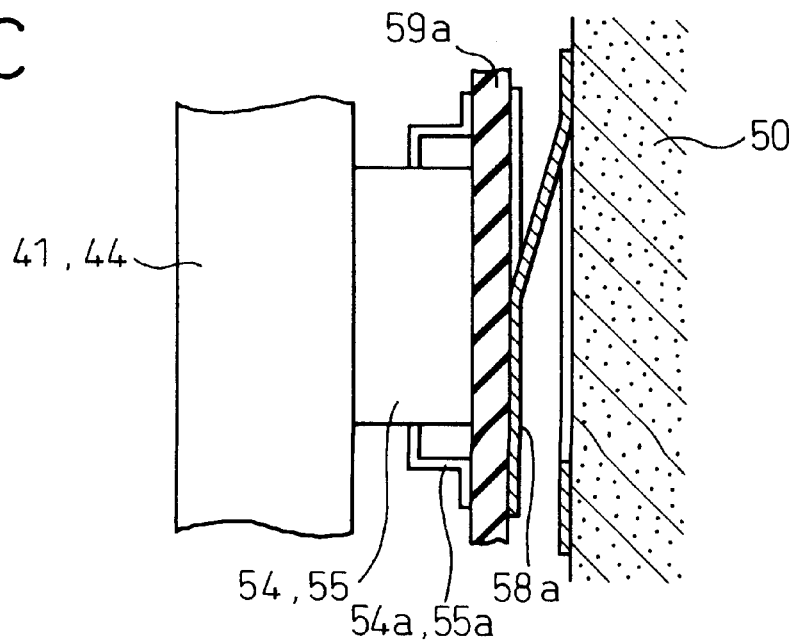
FIG. 10C is a partially-enlarged sectional diagram showing the configuration of a heater to be used between the transfer jig and the mounting member, which are employed in the apparatus of the present invention.

(3) In the case that the heater is provided between the upper frame and each of the oblique frames:

In this case, as shown in FIG. 10C, the heaters 54 and 55 are provided in a space between the mounting member 50 and each of the upper frame 41 and the oblique frame 44. The heaters 54 and 55 are placed on the insulating plate 59a. Further, a pushing spring 59a is inserted between this insulating plate 59a and the mounting member 50. The heaters 54 and 55 are pushed by the pushing spring 58a lightly against the upper frame 41 and the oblique frame 44. Reference numerals 54a and 55a denote electrodes of the heaters 54 and 55, respectively. The heaters 54 and 55 generate heat when the voltage is applied between the electrodes 54a and 55a.

Furthermore, the heat source is not limited to the heater, and conversely, a cooling system may be employed instead of the heater. In such a case, an operation is reverse to that in the case of using the heater as the heat source. When it is intended that the central portion of the bar 3 is projected downwardly, the upper frame 41 should be cooled. In contrast, when it is intended that both end portions of the bar 3 are projected downwardly but the central portion thereof is protruded upwardly, the oblique frame 44 should be cooled.

Such a transfer jig 40 of the first embodiment can be attached to the lapping head 30. In addition, this transfer jig 40 can be attached to the conventional lapping head of the swinging type. Moreover, when lapping the workpiece by using this transfer jig 40, the correction of the difference in stock removal between the left-hand and right-hand sides of the bar 3 is performed under the control of the control unit by the lapping correction mechanism 60 according to the degree of the progression of the lapping of the bar 3 as the lapping thereof progresses. Thus, the correction of the warp of the bar 3 can be performed by the transfer jig 40. Then, when the thickness (or the lapping amount) of the bar 3 reaches a predetermined value, the lapping is terminated by stopping the rotation of the lapping plate 11 and the lapping head 30.

Figure 11A:
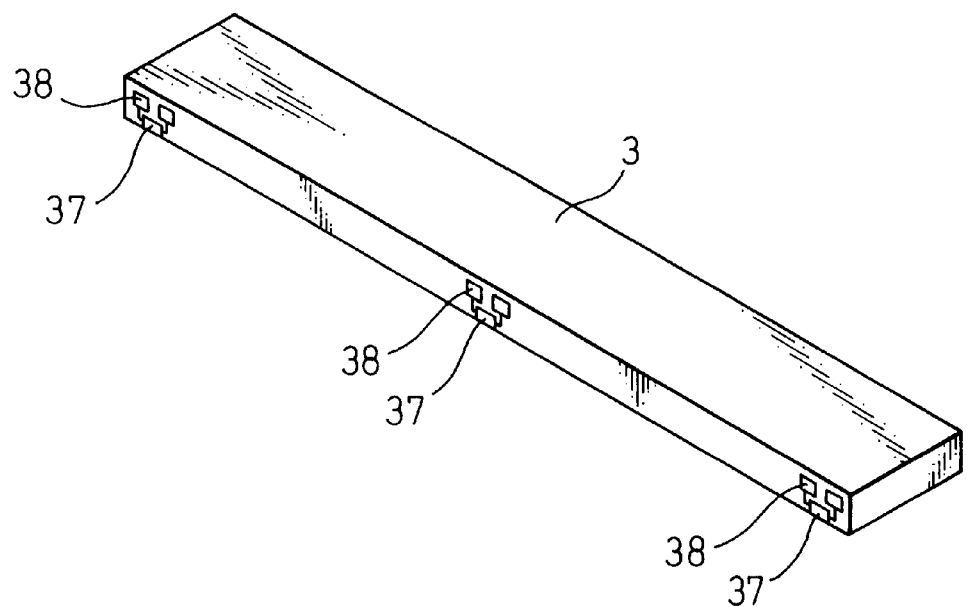
FIG. 11A is a diagram showing the placement of ELG elements on a workpiece to be lapped by being attached to the transfer jig of the first embodiment of the present invention.

FIG. 11A illustrates an example of a system of detecting the degree of the progression of the lapping of the bar 3. In the bar 3 of this example, ELG devices, each of which has predetermined resistance, are embedded in the bar 3 at both end portions and the central portion thereof, in addition to MR head device (not shown). Both end portions of each of ELG devices are connected to the terminal 38 provided on a side of the bar 3. The resistance value of each of ELG devices 37 can be detected by letting electrical current flow between the terminals 38. Furthermore, as the lapping of MR head progresses, this ELG device 37 is lapped or polished. Moreover, the resistance value between the terminals 38 varies.

Figure 11B:
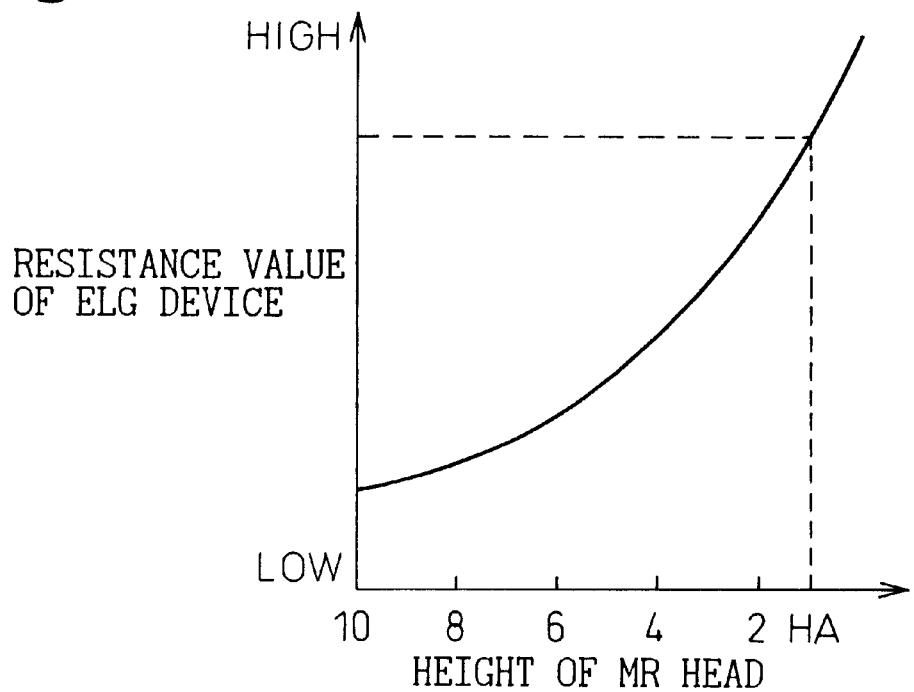
FIG. 11B is a characteristic graph illustrating variation in resistance of an ELG device of FIG. 11A when lapping the workpiece.

FIG. 11B illustrates the relationship between the height of MR head in the bar 3 and the resistance value of ELG device 37. In this figure, "HA" indicates the lapping reference height of MR head. This lapping reference height of this MR head can be obtained by monitoring the resistance value of ELG device. Further, if the resistance values of ELG devices 37 increase uniformly in the middle of the lapping process, this reveals that the bar 3 is lapped uniformly. In contrast, if there occurs a variation among the resistance values of ELG devices, this shows that the bar 3 is not lapped uniformly. In this case, the lapping of the bar 3 can be made to be performed uniformly by displacing the bar 3 by the aforementioned transfer jig 40 and the lapping correction mechanism 60 according to the kind of the variation among resistance values of ELG devices 37.

Tables described in FIGS. 12A and 12B illustrate a correction process performed according to a variation in height of MR devices, which is detected in the lapping process by using the resistance values of ELG devices.

The Example of FIG. 12A corresponds to the case that the height of MR device is high at the central portion thereof when the lapping time reaches t1 after initiating the lapping process. In this case, as illustrated in FIG. 9A, the correction process, by which the central portion of the bar 3 is projected to the lapping-plate side is performed by energizing the heater 55 overlapping with the oblique frame 44 of the transfer jig 40. It is assumed herein that when the lapping time reaches t2, the height of the MR device becomes high at both end portions thereof as a result of performing such a correction process. In this case, as described by referring to FIG. 9B, another correction process, by which both end portions of the bar 3 are protruded to the lapping plate side, is performed by applying voltage to the heater 54 overlapping with the upper frame 41 of the transfer jig 40. Moreover, it is now assumed that when the lapping time reaches t3, the height of the MR device becomes equal to one another at both end portions thereof and at the central portion thereof as a result of performing this correction process. In this case, the power supplied to the heater 54 is maintained or held. By displacing the transfer jig 40 in this way, the bar 3 is uniformly lapped or polished to the reference value.

Example of FIG. 12B corresponds to the case that the height of MR device becomes high at the left-hand side portion thereof and the bar 3 is inclined so that the right-hand side portion of the bar 3 goes downward when the lapping time reaches T1 after the lapping process is initiated. In this case, as illustrated in FIG. 8, the correction process, by which the mounting member 50 is turned counterclockwise and the bar 3 is leftwardly inclined so that the left-hand side portion thereof goes downward (as viewed in this figure), is performed by energizing the left-hand side solenoid 64 provided in the lapping head 30. It is assumed herein that when the lapping time reaches T2, the height of the MR device becomes high at right-hand side portion thereof and the bar 3 is inclined leftwardly as a result of performing such a correction process. In this case, another correction process, by which the mounting member 50 is turned clockwise and the bar 3 is inclined rightwardly so that the right-hand side portion thereof goes downwardly, is performed by applying voltage to the right-hand side solenoid 64 provided in the lapping head 30. Moreover, it is now assumed that when the lapping time reaches T3, the heights of the MR devices become equal to one another at central portion thereof and at both end portion thereof as a result of performing this correction process. In this case, the power supplied to both of the solenoids 64 is stopped, so that these solenoids 64 are brought into a non-energized state. By slightly turning the mounting member 50 in this way, the bar 3 is uniformly lapped or polished to the reference value.

The aforementioned correction processes are simple examples thereof. However, in actual cases, the control unit 18 described with reference to FIG. 3 reads a change in resistance value of each of three ELG devices and then controls the transfer jig 40 and the lapping correction mechanism 60 in a complicated manner.

Figure 13:
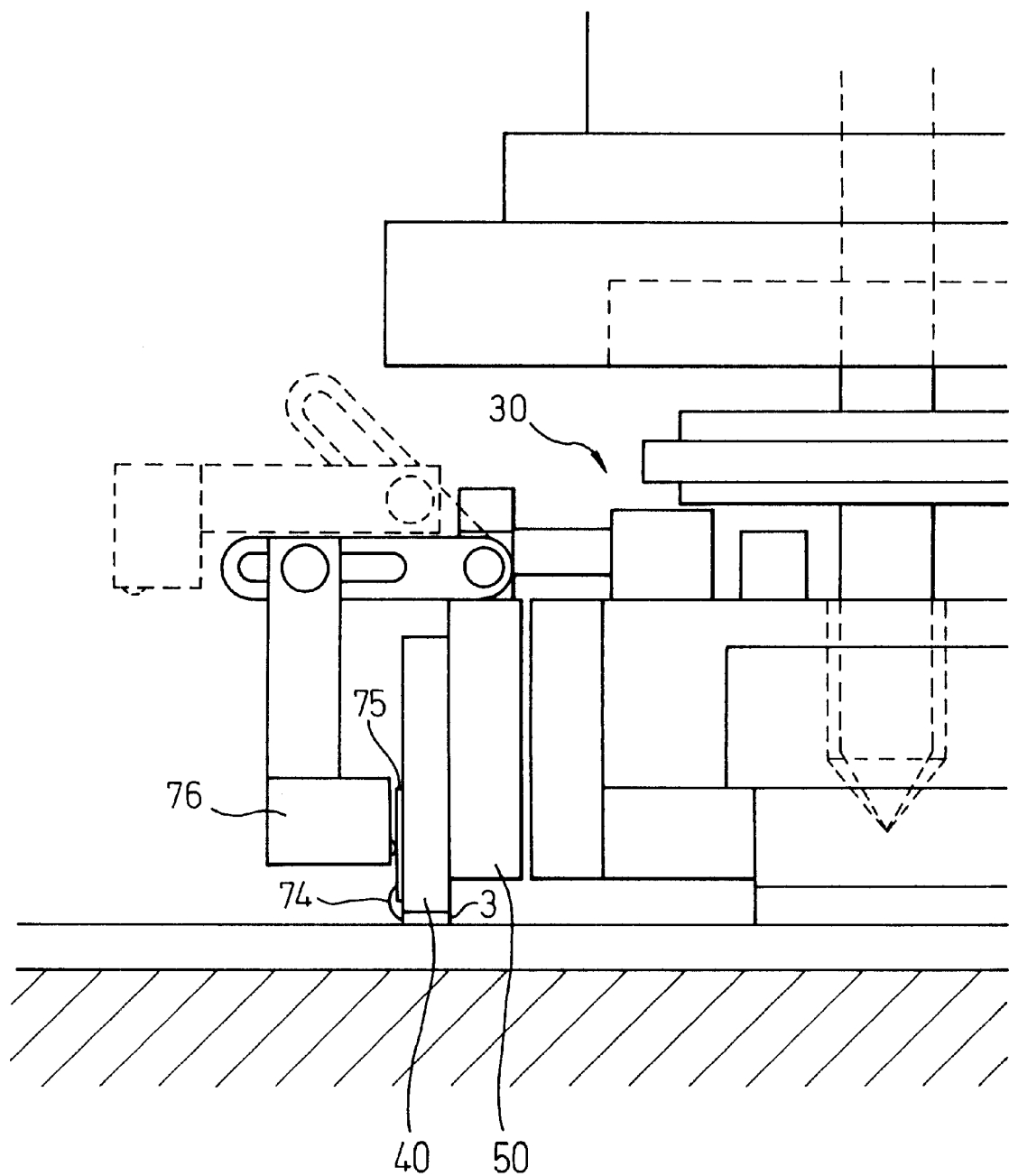
FIG. 13 is a partially enlarged side diagram showing the configuration of a probe for an electrical signal from a printed circuit board provided in the transfer jig.

Incidentally, in the case of the aforementioned embodiment, the method of monitoring the lapped state is to detect the resistance of ELG devices which are monitor resistors placed on the bar 3 in which MR head is formed. However, the lapped state may be monitored by detecting the resistance values of MR devices. Moreover, in the case of the aforementioned embodiment, the terminals 38 are provided on the side surface of the bar 3. However, in the case of detecting the resistance values of ELG devices 37, as illustrated in FIG. 13, the resistance values thereof are actually detected through the printed circuit board 75 provided on the side surface of the transfer jig 40. Namely, the terminals 38 provided on the bar 3 communicate with the terminals (not shown) provided on this printed circuit board 75 by wire-bonding 74. Then, the resistance values are obtained from the printed circuit board 75 through a probe 76. This probe 76 can be attached to the mounting member 50 or to the lapping head 30.

Figure 14:
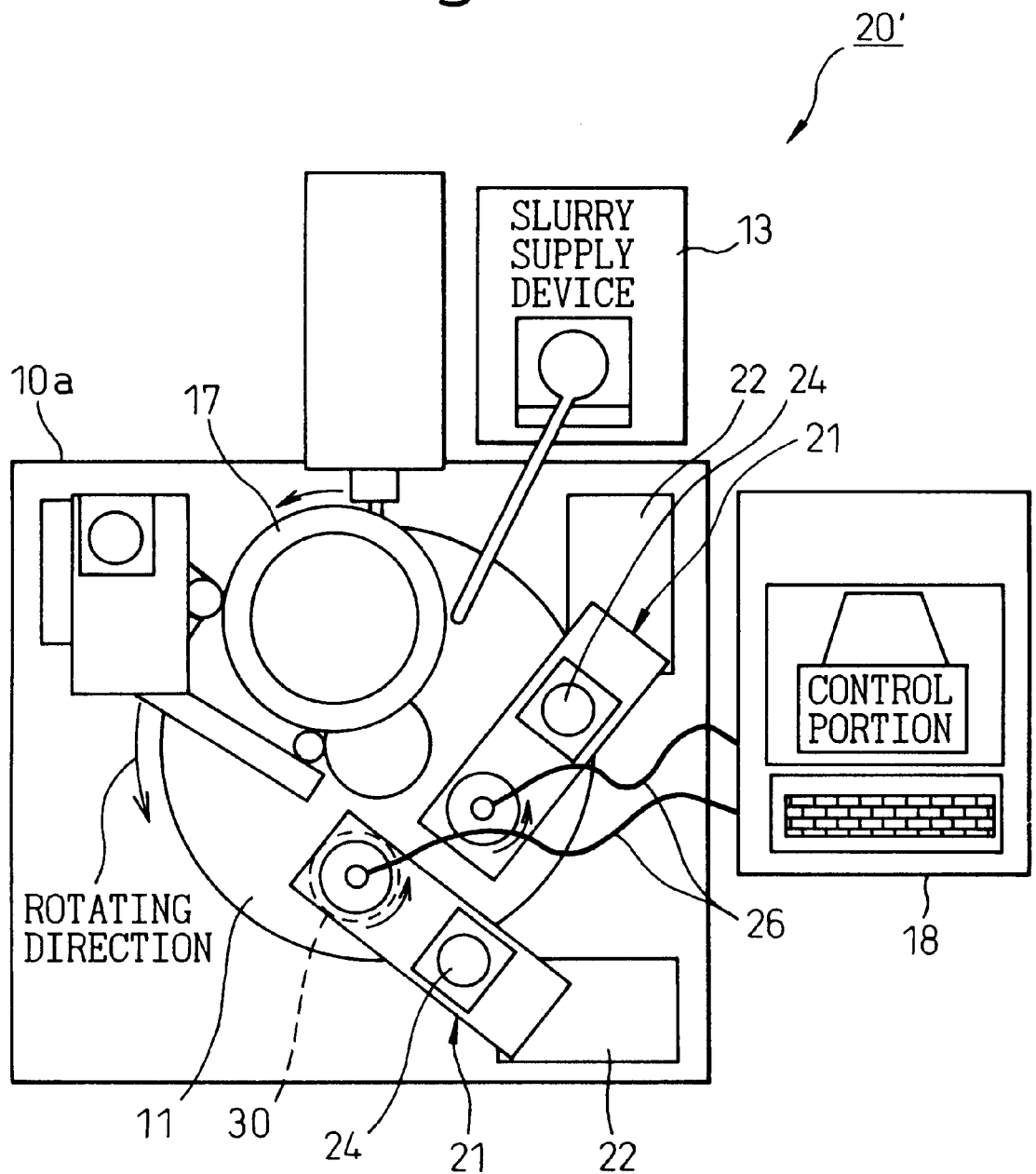
FIG. 14 is a plan view of the configuration of the lapping apparatus showing another embodiment of the present invention.

FIG. 14 shows the configuration of another example of the lapping apparatus 20' (namely, a modification of the first embodiment) of the present invention. In the lapping apparatus 20 described by referring to FIG. 3, only one lapping jig 21 is placed on the lapping plate 11. In contrast, in this example, two lapping jigs 21 are placed on the lapping plate 11. The configuration of the example of FIG. 14 is the same as of the lapping apparatus 20 except that the two lapping jigs 21 are placed on the lapping plate 11. Therefore, in this figure, like reference numerals designate like composing members of FIG. 3. Further, the description of such composing members is omitted herein. In this manner, two or three lapping jigs 21 can be attached to a single lapping apparatus.

Incidentally, in the case that plural lapping jigs 21 are placed on the lapping plate 11, the heights of the bars 3 attached to the lapping head 30 of the lapping jig 21 rarely reaches the reference value at the same time. In the case that the lapping of one of the plural bars 3 is terminated earlier that those of the other bars 3, the lapping thereof should be interrupted, and the bar 3, the lapping of which has been completed earlier, should be taken out of the apparatus. The lapping interruption mechanism 80 described by referring to FIG. 5 is used for interrupting the lapping in such a case.

In the case that the lapping of one of the plural bars 3 is finished earlier than that of the other bars 3, the solenoid 81 of the lapping interruption mechanism 80 is energized. Further, the plunger 82 is projected from the solenoid 81. Then, the pad 83 is pressed against the lapping plate 11. Thus, the lapping head 30 is pushed up from the lapping plate 11. In this state, the pads 83 provided at the ends of three plungers 82 are brought into contact with the lapping plate 11. Consequently, the bar 3 and the dummy workpiece 7 come to be unpolished. This lapping interruption mechanism 80 changes the timing, with which the bar 3 is released or detached from the lapping plate 11, correspondingly to each of the lapping jigs 21. Thus, the lapping can be terminated when the thickness of the bar reaches a predetermined value corresponding to each lapping jig 2.

Figure 15A:
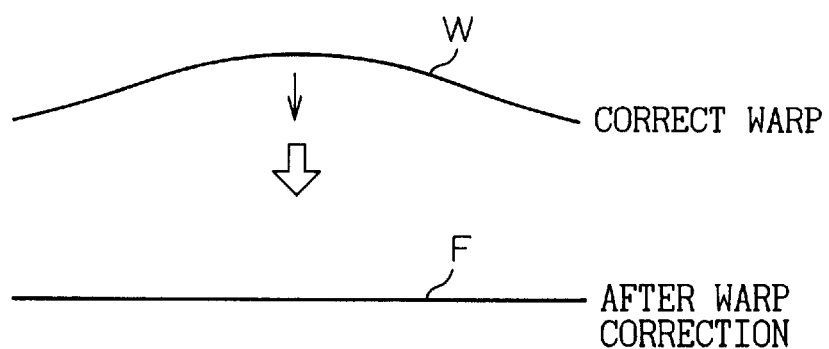
FIG. 15A is an explanatory diagram illustrating a correction operation in the case that a bar has a laterally symmetric warp.
Figure 15B:
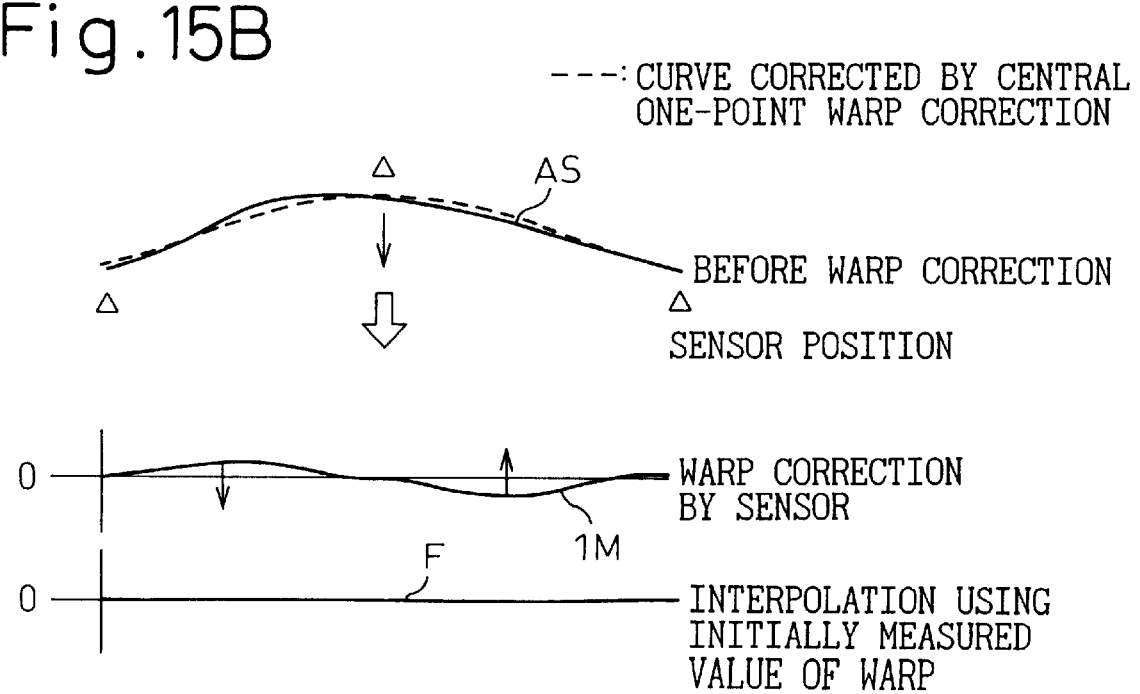
FIG. 15B is an explanatory diagram illustrating a correction operation in the case that a bar has a laterally asymmetric warp.

If the combination of the transfer jig 40 and the mounting member 50 of the first embodiment is used, in the case that the bar 3 has a laterally symmetric warp W as illustrated in FIG. 15A, the warp W is corrected in such a manner that the bar has a flat surface as indicated by F. However, in the case that, as shown in FIG. 15B, the bar 3 has a complicated warp AS as represented by an off-centered parabolic curve, a cubic curve or a quartic curve, if the combination of the transfer jig 40 and the mounting member 50 of the first embodiment is used, an error is introduced in the corrected shape IM of the warp AS. In such a case, the going-in and going-out operations of the transfer jig 40 and the inclination of the mounting member 50 should be controlled precisely by performing an interpolation using initially measured values of the warp of the bar 3.

In this manner, even if the bar 3 has an asymmetric warp with respect to the center thereof, the lapping accuracy is enhanced by increasing the number of correction points between both lateral ends of the bar 3 from one to two or more.

FIG. 16 shows the placement of the transfer jig 140 and a mounting member 150 of a second embodiment of the present invention, in which the number of correction points set between both lateral ends of the bar 3 is increased to three. In this figure showing the second embodiment, like reference numerals designate like composing members of the first embodiment.

Transfer jig 140 of the second embodiment has a rectangular frame structure made of metals or ceramics, which are materials that expand and contract upon being heated and cooled. Further, the transfer jig 140 is provided with an upper frame 141, a lower frame 142 on the bottom surface of which the bar 3 is provided, and lateral side frames 143. Moreover, the midpoint of the upper frame 141 is connected with the midpoint of the lower frame 142 by a center frame 145. Furthermore, an intermediate frame 144, which is in parallel with the center frame 145, is provided between the center frame 145 and each of the lateral side frames 143. In the case of this embodiment, the elements of the transfer jig 140 are made of a same material and have a same thickness. However, the elements of the transfer jig 140 do not necessarily have the same thickness. The frames 141 to 145 have nearly the same shape. Furthermore, the width of the lower frame 142 is larger than that of the upper frame 141, with the intention of increasing the displacement per unit heating value of the heater (to be described later).

A small oval shape hole 148 for preventing the heat of the heater from being transmitted to the upper frame 141 is formed in the connection portion of each of the side frames 143, the intermediate frame 144 and the center frame 145, at which these frames are connected with the upper frame 141. Further, a notch 149 for preventing the heat of the heater from being transmitted to the lower frame 142 is formed in the connection portion of each of the side frames 143, the intermediate frame 144 and the center frame 145, at which these frames are connected with the lower frame 142. The small oval shape holes 148 may be replaced with the notches 149 and vice versa. Moreover, only one of the small and shape hole or the notch may be provided in these connection portions.

Mounting pieces 147 to be connected with the upper frame 141 are provided at both ends of the center frame 145. Further, a mounting hole 147a is bored in each of these mounting pieces 147. Moreover, the connection portion, with which the upper frame 141 is connected, of each of the mounting pieces 147 is constricted and thus forms a positioning concave portion 146. Furthermore, groves 142a are provided at uniform intervals in the direction of the width of the bar 3 in a mounting surface portion of the lower frame 142. These grooves 142a are used for changing the shape of the lower frame 142 into a complicated shape.

Mounting member 150 for mounting the transfer jig 140 in the second embodiment is composed of: a rectangular prism base 151B whose outward form is a size larger than the transfer jig 140; and a cover portion 151A provided on the mounting base 151B in such a manner as to be integral therewith. Further, a post (or pillar) 61, which is similar to the post 61 of the lapping correction mechanism 60 of the first embodiment, is provided on the top surface of the cover portion 151A. Further, a positioning pin 152 for regulating the position of the top end face of the transfer jig 140 is protrusively provided on the transfer-jig-side end face of the cover portion 151A.

Furthermore, a mounting hole 156 is formed in the central portion of the mounting base 151B. The mounting base 151B is fixed to the rotating shaft 34 provided on a side surface 30a of the lapping head 30 by using a screw 157 inserted into this mounting hole 156. Moreover, mounting holes 153 are formed at the places which correspond to the mounting holes 147a of the transfer jig 140, on both sides thereof, under this mounting hole 156. Furthermore, a hole 157 formed at a place, which is outside the positions of the mounting holes 153, is used for mounting an insulating plate 130 (to be described later).

A plate spring 120 for pushing the insulating plate 130 is placed on the mounting base 151B of the transfer jig 140. This plate spring 120 has: a rectangular frame 121; a spring portion 122 extending obliquely from one side of this frame 121; a pushing portion 123 which is connected to the tip end portion of the spring portion 122 and is in parallel with the frame 121; and a mounting portion 125 provided with a mounting hole 124. The mounting hole 124 is placed at a place where the hole 124 overlaps with the hole 157 formed in the mounting base 151B when the plate spring 120 is put on the mounting base 151B. The mounting portion 125 provided with the frame 121, the spring portion 122, the pushing portion 123 and the mounting hole 124 can be made by punching a sheet spring material.

The insulating plate 130 provided with a heater 131 is inserted into a space between this plate spring 120 and the transfer jig 140. This insulating plate 130 is used for insulating an electrode 132 of the heater 131. The place at which the heater 131 is placed, on the insulating plate 130, corresponds to the place where the heater 131 faces or overlaps with the side frame 143, the intermediate frame 144 and the center frame 145 of the transfer jig 140, which overlap this insulating plate 130. Moreover, two positioning pins 133 to be inserted through the positioning concave portions 146 of the transfer jig 140 are protrusively provided on the insulating plate 130. Moreover, two mounting holes 134, through which screws are inserted, are provided in the insulating plate 130. The place at which the mounting hole 134 is provided is the position at which the hole 134 overlaps with the mounting hole 124 when overlapping with the spring 120.

In the case of the second embodiment, the plate spring 120 is placed on the mounting base 151B of the mounting member 150. Then, in the state that the mounting hole 124 overlaps with the hole 157, the insulating plate 130 is stacked on the plate spring 120 in such a way as to overlap therewith. Further, the insulating plate 130 and the plate spring 120 are mounted on the mounting base 151B of the mounting member 150 by using screws 135. Thereafter, in the condition that the pin 133 protrusively provided on the insulating plate 130 is inserted into the positioning concave portion 146, the transfer jig 140 is put on the insulating plate 130 in such a manner as to overlap therewith. At that time, the mounting hole 153 in the mounting base 151B, the mounting hole 135 of the insulating hole 135 and the mounting hole 137 of the transfer jig 140 overlap one another. Thus, the transfer jig 140 is mounted on the mounting base 151B by inserting the screws 39 through these mounting holes. Then, each of the heaters 131 provided on the insulating plate 130 is pushed against the spring portion 122 of the plate spring 120 and are thus brought into close contact with the back surfaces of the frames 141 to 145 of the transfer jig 140.

Figure 17:
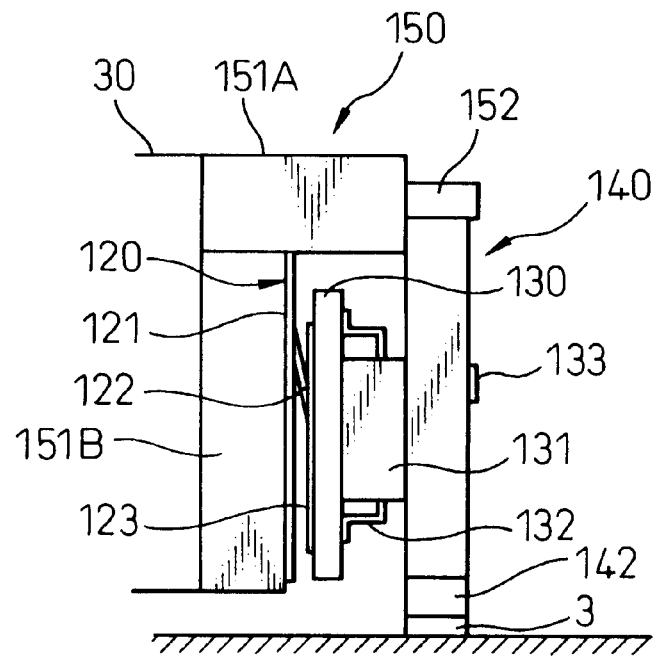
FIG. 17 is a partially enlarged side diagram showing a state of the transfer jig of the second embodiment of the present invention of FIG. 16, which is attached to the lapping head together with a mounting member.

FIG. 17 shows the state in which the mounting member 150 is attached to a side of the lapping head 30 after the transfer jig 140 is attached to the mounting member 150 together with the plate spring 120, the insulating plate 130 and the heater 131. As shown in this figure, the transfer jig 140 is positioned by the pins 133, which are protrusively provided on the insulating member 130, and the positioning pins 152, which are protrusively provided on the cover portion 151 of the mounting member 150. The bar 3 stuck onto the bottom surface of the lower frame 142 projects downwardly from the bottom surface of the mounting member 150. Further, the heaters 131 provided on the insulating member 130 are pushed against the plate spring 120 and are in close contact with the frames.

The heaters 131 of the second embodiment have the configuration described by referring to FIG. 10C. The heaters 131, however, may have the structures as illustrated in FIGS. 10A and 10B.

The configuration of the lapping correction mechanism 60 of the second embodiment is the same as of the mechanism 60 of the first embodiment. Thus, the description of this mechanism 60 is omitted herein. In the second embodiment, the mounting member 150 mounted on the rotating shaft 34, which is attached to a side surface 30a of the lapping head 30, is rotated by applying voltage to one of the solenoids 64, so that the bar 3 mounted on the transfer jig 140 is tilted.

Figure 18:
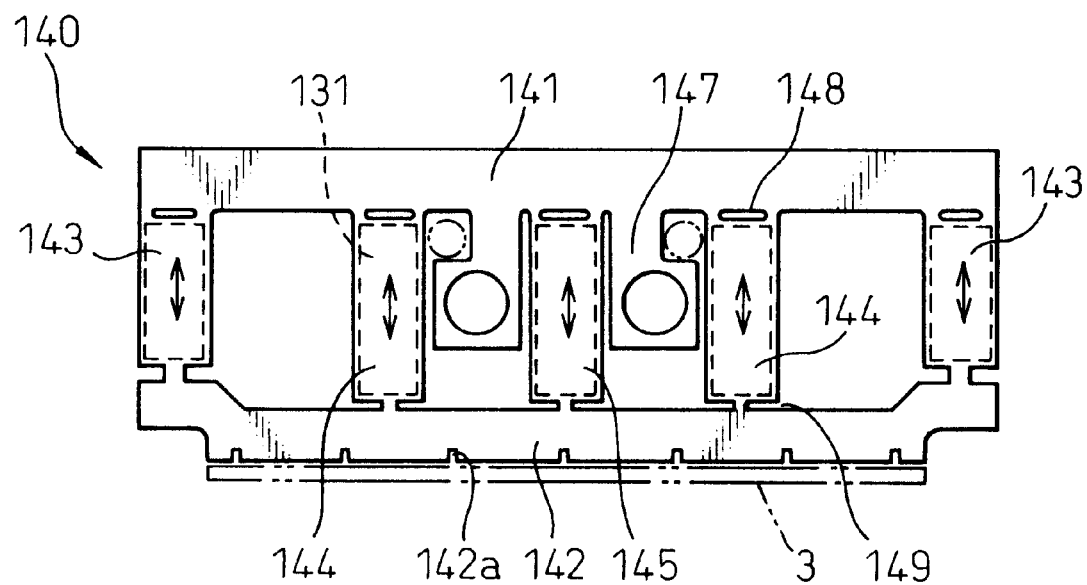
FIG. 18 is an explanatory diagram illustrating an operation of the transfer jig of the second embodiment of the present invention.

Next, the correction mechanism for correcting a warp of the bar 3 stuck onto the transfer jig 140 of the second embodiment constructed as above described will be described hereunder by referring to FIG. 18. As shown in this figure, the transfer jig 140 of the second embodiment is provided with: the upper frame 141; the lower frame 142 on the bottom surface of which the bar 3 is provided; the lateral side frames 143; the center frame 145 for connecting the midpoint of the upper frame 141 with the midpoint of the lower frame 142; and two intermediate frames 144, which are in parallel with the center frame 145, are provided between the center frame 145 and each of the lateral side frames 143. Further, the heaters 131 are in close contact with the rear surfaces of the frames 141 to 145. Further, the transfer jig 140 is fixed to the mounting member 150 by using only the mounting piece 147 provided in a space among the center frame 145 and the two intermediate frames 144. Thus, the remaining part thereof can be freely deformed. In the condition that the transfer jig 140 is fixed to the mounting member 150, the bar 3 stuck onto the bottom surface of the lower frame 142 of the transfer jig 140 projects from the bottom surface of the mounting member 150 downwardly.

In the case of this embodiment, the transfer jig 140 configured as above described is made of metals or ceramics and is formed into one piece. Although a linear or plate-like heating wire is usually used in this heater, other heat sources or cooling means, such as Peltier devices, may be employed in place of such a heating wire. Further, when heated by energizing the heater 131, the frames, which are in close contact with the heater 131, expand. An elongated hole 148 is formed in the connection portion of each frame to be connected with the upper frame 141. Moreover, a notch 149 is provided in the connection portion of each frame to be connected with the lower frame 142. Thus, heat transmitted from the heater 131 to the frames hardly conducts to the upper frame 141 and the lower frame 142. Consequently, the frames are efficiently heated by the heaters 131, so that the frames are expanded.

In the case of the second embodiment, the transfer jig 140 has five longitudinal frames 141 to 145. Grooves 142a for enabling a partial deformation of the lower frame 142 are provided at predetermined intervals in a direction orthogonal to the longitudinal direction in the frame 142 connected to the frames 141, 143, 144 and 145. Further, an amount of a warp of the bar 3 changes in proportion to the heating value (wattage) of the heater 131 and thus the proportional control thereof can be performed according to a heater current rate. Therefore, various warps of the bar 3 can be corrected when the magnitudes of the expansion of the frames in the transfer jig 140 of the second embodiment are determined by controlling the heater current rate of a heater current supplied to the heaters 131.

Figure 19:
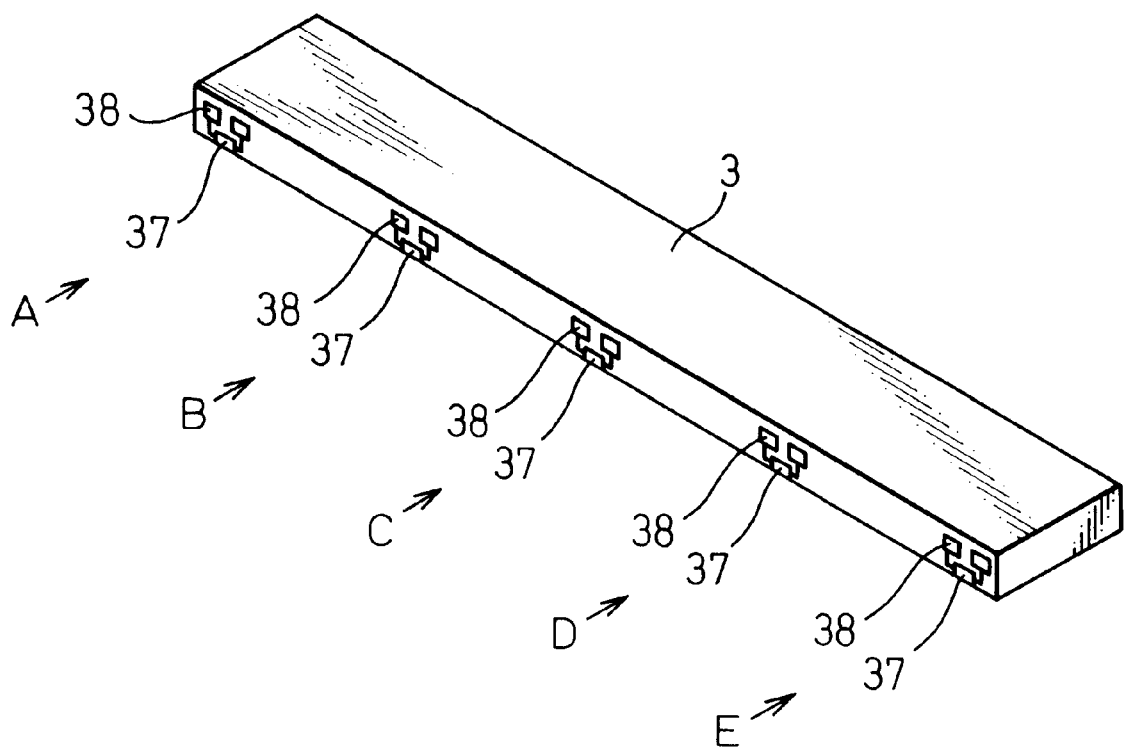
FIG. 19 is a diagram showing the placement of ELG devices on a workpiece to be lapped by being attached to the transfer jig of the second embodiment of the present invention.

FIG. 19 illustrates an example of a system of detecting the degree of the progression of the lapping of the bar 3, which is performed by using the transfer jig 140 of the second embodiment. In the bar 3 of this example, ELG devices 37, each having a predetermined resistance, are embedded in the bar 3 at five places, namely, at both end portions and the central portion thereof, in addition to MR head device (not shown). Both end portions of each of ELG devices are connected to the terminal 38 provided on a side of the bar 3. The resistance value of each of ELG devices 37 can be detected by letting electrical current flow between the terminals 38. Furthermore, as the lapping of MR heads progresses, the ELG devices 37 are lapped or polished. Moreover, the resistance value between the terminals 38 varies. The relation between the change in height of MR head and the resistance value of ELG device 37 is as illustrated in FIG. 11B.

Tables described in FIGS. 20A and 20B illustrate a correction process performed according to a variation in height of MR devices, which is detected in the lapping process by using the resistance values of ELG devices.

Example of FIG. 20A corresponds to the correction process in the case of lapping the bar 3 which has five ELG devices 37 indicated by A to E, similarly as described by referring to FIG. 19. It is assumed that the height of an MR device is low at the central portion thereof and is nonuniformly high between the central portion and each of both of the end portions when the lapping time reaches t1 after initiating the lapping process. In this case, the correction process for correcting the height of MR device is performed by energizing the heaters 131 corresponding to ELG devices 37 placed at the places B, C and D. Then, when the lapping time reaches t2, and when the lapping time reaches t3, the height of the MR device is checked again. Further, a correction process, by which the height of the bar 3 is increased or decreased, is performed by energizing the corresponding heaters 131 so that the heights of MR devices are uniform. Thereafter, it is assumed that when the lapping time reaches t4, the heights of MR device obtained at the five places corresponding to ELG devices 37 become equal to one another, as a result of this correction process. In this case, the power supplied to the heater 131 is maintained or held.

Figure 21A:
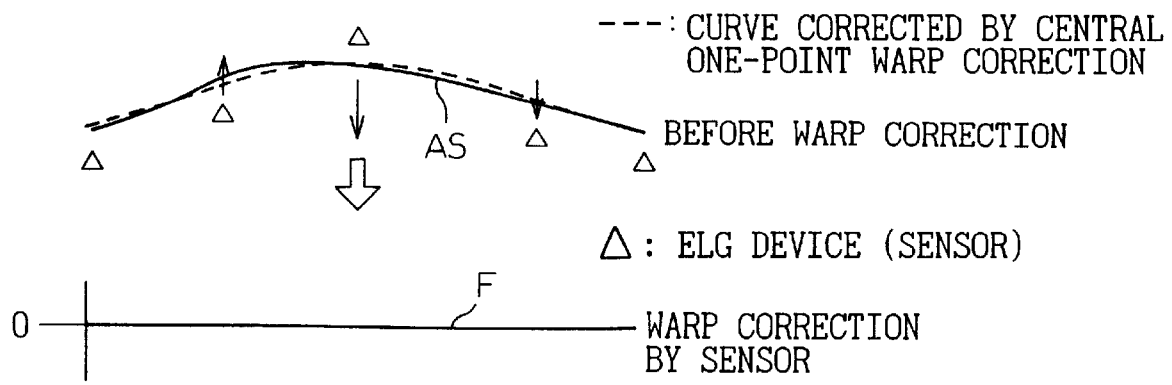
FIG. 21A is an explanatory diagram illustrating an operation of correcting a warp of a bar in the case that five ELG devices are provided on the transfer jig of the second embodiment of the present invention.

In the case of the transfer jig 140, which is provided with five displacement mechanisms, of the second embodiment, ELG elements (or sensors) are provided at five places as illustrated in FIG. 21A. Thus, even in the case that a warp, which is asymmetrical with respect to the center of the bar 3, occurs therein as indicated by characters AS, the warp is flattened as indicated by a character F during the bar 3 is lapped until the stock removal reaches a reference value, by changing the displacements of the five frames 141 to 145.

Figure 21B:
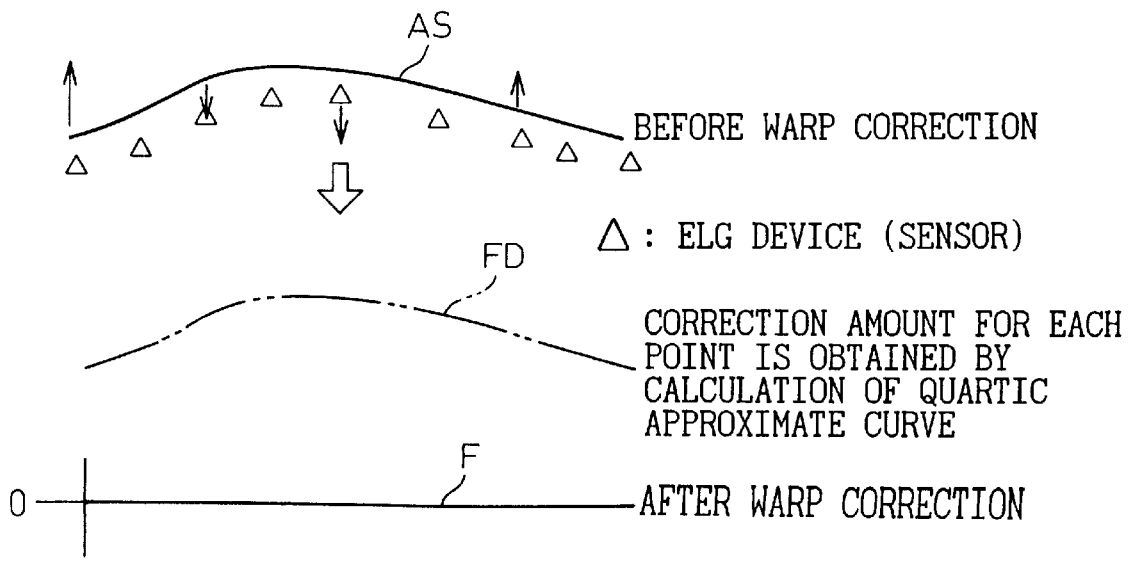
FIG. 21B is an explanatory diagram illustrating an operation of correcting a warp of the bar in the case that multiple, namely, five or more ELG devices are provided on the transfer jig of the second embodiment of the present invention.

Incidentally, the bar 3 attached to the transfer jig 140 of the second embodiment may be provided with ELG devices 37 at five places or more as illustrated in FIG. 21B. In this case, quartic approximate curve data FD is calculated in the control unit 18, which is described by referring to FIG. 3, from the detected value of the warp AS. Thus, correction amounts are determined correspondingly to the five places in the transfer jig 140. Moreover, heater currents supplied to the five heaters 131 on the insulating plate 130 are determined. Consequently, the bar 3 is flattened as indicated by a character F.

Further, an example illustrated in FIG. 20B corresponds to the case that the height of MR device becomes high at the left-hand side portion thereof and the bar 3 is inclined so that the right-hand side portion of the bar 3 goes downwardly, when the lapping time reaches T1 after initiating the lapping process. In this case, as illustrated in FIG. 8, the correction process, by which the mounting member 150 is turned counterclockwise and the bar 3 is leftwardly inclined so that the left-hand side portion thereof goes downwardly (as viewed in this figure), is performed by energizing the left-hand side solenoid 64 provided in the lapping head 30. It is assumed that when the lapping time reaches T2, the height of the MR device becomes high at right-hand side portion thereof and the bar 3 is inclined leftwardly as a result of performing this correction process. In this case, another correction process, by which the mounting member 150 is turned clockwise and the bar 3 is inclined rightwardly so that the right-hand side portion thereof goes downwardly, is performed by energizing the right-hand side solenoid 64 provided in the lapping head 30. Moreover, it is now assumed that when the lapping time reaches T3, the heights of the MR devices becomes equal to one another at all places corresponding to five ELG devices 37 as a result of performing this correction process. In this case, the power supplied to both of the solenoids 64 is stopped, so that these solenoids 64 are brought into a non-energized state. By slightly turning the mounting member 150 in this way, the bar 3 is uniformly lapped or polished to the reference value.

The aforesaid correction processes are simple examples thereof. However, in actual cases, the control unit 18 described with reference to FIG. 3 reads a change in resistance value of each of the five ELG devices and then controls the transfer jig 40 and the lapping correction mechanism 60 in a complicated manner.

Incidentally, in the case of the aforementioned embodiment, the method of monitoring the lapped state is to detect the resistance of ELG devices which are monitor resistors placed on the bar 3 in which MR head is formed. However, the lapped state may be monitored by detecting the resistance values of MR devices. Moreover, in the case of the aforementioned embodiment, the terminals 38 are provided on the side surface of the bar 3. However, in the case of detecting the resistance values of ELG devices 37, as illustrated in FIG. 13, the resistance values thereof are actually detected through the relay printed circuit board 75 provided on the side surface of the transfer jig 40. Namely, the terminals 38 provided on the bar 3 communicate with the terminals (not shown) provided on this relay printed circuit board 75 by wire-bonding 74. Then, the resistance values are obtained from the relay printed circuit board 75 through a probe 76. This probe 76 can be attached to the mounting member 50 or to the lapping head 30.

Thus, in the case of employing the lapping tool in which the plate spring 120, the insulating plate 130 and the heater 131 are sandwiched between the transfer jig 140 and the mounting member 150 as of the second embodiment of the present invention, various kinds of warps can be corrected by using a simple structure.

As above described, in accordance with the lapping apparatus of the present invention, the lapping jig of the present invention, the workpiece mounting member having the transfer jig and the mounting member according to the present invention, there is provided a compact automatic correction lapping system of a simple structure, by which the satisfactorily lapped surface of a workpiece to be lapped can be obtained. The lapping system of the present invention is best-suited to the control of the height of an MR head.

Although the preferred embodiments of the present invention have been described above, it should be understood that the present invention is not limited thereto and that other modifications will be apparent to those skilled in the art without departing from the spirit of the invention.

The scope of the present invention, therefore, should be determined solely by the appended claims.

What is claimed is:

1. A lapping apparatus for lapping a workpiece mounted on a workpiece mounting member, which comprises:

a lapping plate provided on an upper part of a main unit of said apparatus in such a manner as to be able to rotate;

at least one lapping jig that has an attaching portion, to which the workpiece mounting member is attached, and is placed on the lapping plate; and a control unit for controlling said lapping jig, wherein said lapping jig is provided with:

a lapping head adapted to be able to rotate in a direction on said lapping plate; and a motor for forcedly causing said lapping head to rotate stably, wherein, in addition to said workpiece mounting member, said lapping head further has:

at least two dummy work materials composing a polished surface, together with said workpiece;

actvatably pivotable lapping correction means for driving said workpiece according to a correction signal to thereby correct a lapped state of said workpiece engaged by a first workpiece mounting memeber affixed thereto said lapping correction means;

a transfer lapping jig having at least one electrically activated, thermally expansible framed second mounting member;

sensor means adapted to be able to convert a remaining untapped quantity of said workpiece;

electrical connection means, which is provided at an end portion of a rotating shaft of said lapping head and is adapted to electrically connect said rotating shaft when being in a rotating state, with said control unit; and electrical wiring means for transmitting an electrical signal, which is sent from said sensor means, and a correction signal, which should be sent to said lapping correction means, with said electrical connection means through an inner portion of said rotating shaft of the aforesaid lapping head, and wherein said control unit is adapted to output a correction signal according to an electrical signal, which is sent from said sensor means, to said lapping correction means through said electrical connection means and said electrical wiring means.

2. The lapping apparatus as set forth in claim 1, wherein two sets of said lapping jigs are placed in said main unit so that two workpieces are lapped simultaneously.

3. The lapping apparatus as set forth in claim 1, wherein a swinging mechanism for swinging said lapping jig approximately in a direction of a radius of said lapping plate is provided in said main unit.

4. The lapping apparatus as set forth in claim 2, wherein a swinging mechanism for swinging said lapping jig approximately in a direction of a radius of said lapping plate is provided in said main unit.

5. The lapping apparatus as set forth in claim 1, wherein said electrical connection means is a multi-electrode slip ring of a shaft-end type.

6. The lapping apparatus as set forth in claim 1, wherein said electrical connection means is a multi-electrode induced current coupler.

7. The lapping apparatus as set forth in claim 1, wherein said workpiece is a plate-like bar in which plural magnetic heads are placed, and wherein said sensor means is a resistance pattern.

8. The lapping apparatus as set forth in claim 7, wherein said magnetic head is MR head, and wherein said sensor means is a resistance pattern formed in one piece independent of said MR head.

9. The lapping apparatus as set forth in claim 7, wherein said magnetic head is an MR head, and wherein said sensor means is an MR head itself.

10. The lapping apparatus as set forth in claim 1, wherein said lapping head comprises lapping interruption means for interrupting a lapping operation by detaching said lapping head from a lapping plate when said lapping plate rotates.

11. The lapping apparatus as set forth in claim 10, wherein said lapping interruption means detaches said workpiece from said lapping plate in a nearly vertical direction.

12. The lapping apparatus as set forth in claim 1, wherein a connector is provided halfway through said electrical wiring means, and wherein said lapping head and said workpiece mounting member are adapted to be able to be separated from each other.

13. The lapping apparatus as set forth in claim 1, wherein said workpiece mounting member has a rotating shaft on a straight line perpendicular to a midpoint of said workpiece and is rotatably mounted on said lapping head through said rotating shaft, and wherein said lapping correction means changes a lateral inclination of said workpiece mounting member with respect to said lapping plate and further changes a finishing rate at lateral ends of said workpiece according to said correction signal.

14. The lapping apparatus as set forth in claim 1, wherein said lapping head has a nearly triangular horizontal section, wherein said workpiece mounting member is attached to a side of said lapping head, and wherein said dummy workpiece mounting members are attached to remaining two sides of said lapping head.

15. The lapping apparatus as set forth in claim 14, wherein a contact area between a dummy workpiece, which is mounted on said dummy workpiece mounting member, and said lapping plate is equal to or greater than a contact area between said workpiece and said lapping plate.

16. The lapping apparatus as set forth in claim 13, wherein said lapping correction means for rotating said workpiece mounting member is plate spring displacement means for displacing an end of a plate spring attached to said workpiece mounting member.

17. The lapping apparatus as set forth in claim 16, wherein said plate spring displacement means is a linear actuator.

18. The lapping apparatus as set forth in claim 16, wherein said plate spring displacement means comprises:
a magnetic sensitive material attached to a free end of said spring; and
magnetic attracting means for attracting said magnetic sensitive material in response to said correction signal.

19. The lapping apparatus as set forth in claim 1, wherein said workpiece mounting member comprises a first mounting member and a second mounting member, wherein said first mounting member is rotatably mounted on said lapping head, wherein said second mounting member is attached to said first mounting member and has a bottom surface serving as a mounting surface on which said workpiece is mounted, and wherein a height of said mounting surface with respect to said lapping plate is able to be partly changed.

20. The lapping apparatus as set forth in claim 1, wherein said second mounting member is made of a material, which expands and contracts when heated and cooled, and comprises:

a rectangular frame portion having an upper frame, a lower frame having a bottom surface to which a workpiece is attached, and left-hand and right-hand side frames;

two oblique frames, each of which connects a corresponding one of both end portions of said upper frame with a midpoint of said lower frame; and a stationary portion which is a central frame connecting a midpoint of said upper frame with a midpoint of said lower frame and is provided with mounting means to be mounted on said first mounting member.

21. The lapping apparatus as set forth in claim 20, which further comprises: heaters that are placed among said first mounting member and said upper frame and two oblique frames of said second mounting member and is capable of heating said upper frame and two oblique frames independent of one another, wherein both end portions of said frame are bent in such a way as to be projected toward said lapping plate according to a heater current supplied to said heater placed at a position where said heater overlaps with said upper frame of said second mounting member, wherein a central portion of said lower frame is bent in such way as to be projected toward said lapping plate according to a heater current supplied to said heater placed at a position where said heater overlaps with two oblique frames of said second mounting member.

22. The lapping apparatus as set forth in claim 1, wherein said second mounting member is made of a material, which expands and contracts when heated and cooled, and comprises:

a rectangular frame portion having an upper frame, a lower frame having a bottom surface to which a workpiece is attached, and left-hand and right-hand side frames;

at least three intermediate frames, which are in parallel with said side frames and connect said upper frame with said lower frame; and a stationary portion which is provided in a space between said two intermediate frames and is connected to said upper frame and is provided with mounting means to be mounted on said first mounting member.

23. The lapping apparatus as set forth in claim 22, which further comprises: heaters that are placed among said first mounting member and said side frames of said second mounting member and intermediate frames and is capable of heating said upper frame and intermediate frames independent of one another, wherein the height of said lower frame from the said lapping plate is able to be partly changed according to a heater current supplied to said heater.

24. The lapping apparatus as set forth in claim 23, wherein grooves orthogonal to a longitudinal direction of said lower frame are placed at plural positions at predetermined intervals in a direction perpendicular to a longitudinal direction of said lower frame in a mounting surface portion, on which said workpiece is mounted, of said lower frame.

25. The lapping apparatus as set forth in claim 23, wherein said heaters are placed on an insulating plate, and wherein a spring for pushing said heaters toward said first mounting member is provided between said insulating plate and said first mounting member.

26. The lapping apparatus as set forth in claim 21, which further comprises heat-radiation preventing means for preventing heat transmitted to each frame from conducting to said upper frame and said lower frame, which is provided in connection portions between said upper frame and each frame and between said lower frame and each frame.

27. The lapping apparatus as set forth in claim 21, wherein said heaters are sheet-like heaters and are in close contact with said frame, which is to be heated, of said second mounting member.

28. The lapping apparatus as set forth in claim 27, wherein said sheet-like heaters are constituted by flexible printed cables or by sandwiching metallic foil between insulating materials.

29. The lapping apparatus as set forth in claim 28, wherein conductor patterns of said sheet-like heaters are copper patterns.

30. The lapping apparatus as set forth in claim 28, wherein conductor patterns of said sheet-like heaters are nichrome patterns.

31. The lapping apparatus as set forth in claim 21, wherein said heaters are sheet-like heaters and are mounted on said first mounting member.

32. The lapping apparatus as set forth in claim 21, wherein said first mounting member and said heaters are isolated by air or by heat insulating material.

33. The lapping apparatus as set forth in claim 1, wherein said lapping head is provided with a probe for taking an electrical signal, which represents a remaining untapped quantity, out of said sensor means.

34. The lapping apparatus as set forth in claim 1, which further comprises: a relay printed circuit board, provided in said workpiece mounting means, for relaying an electrical signal, which represents a remaining unpolished quantity and is outputted from said sensor means that is provided in said workpiece, and wherein said lapping head is provided with a probe for taking an electrical signal, which represents a remaining untapped quantity, out of said relay printed circuit board.

35. The lapping apparatus as set forth in claim 11, wherein a connector is provided halfway through said electrical wiring means, and wherein said lapping head and said workpiece mounting member are adapted to be able to be separated from each other.

36. The lapping apparatus as set forth in claim 12, wherein said workpiece mounting member has a rotating shaft on a straight line perpendicular to a midpoint of said workpiece and is rotatably mounted on said lapping head through said rotating shaft, and wherein said lapping correction means changes a lateral inclination of said workpiece mounting member with respect to said lapping plate and further changes a finishing rate at lateral ends of said workpiece according to said correction signal.

37. The lapping apparatus as set forth in claim 13, wherein said lapping head has a nearly triangular horizontal section, wherein said workpiece mounting member is attached to a side of said lapping head, and wherein said dummy workpiece mounting members are attached to remaining two sides of said lapping head.

38. The lapping apparatus as set forth in claim 18, wherein said workpiece mounting member comprises a first mounting member and a second mounting member,
wherein said first mounting member is rotatably mounted on said lapping head,
wherein said second mounting member is attached to said first mounting member and has a bottom surface serving as a mounting surface on which said workpiece is mounted, and wherein a height of said mounting surface with respect to said lapping plate is able to be partly changed.

39. The lapping apparatus as set forth in claim 19, wherein said second mounting member is made of a material, which expands and contracts when heated and cooled, and comprises:
a rectangular frame portion having an upper frame, a lower frame having a bottom surface to which a workpiece is attached, and left-hand and right-hand side frames;
two oblique frames, each of which connects a corresponding one of both end portions of said upper frame with a midpoint of said lower frame; and
a stationary portion which is a central frame connecting a midpoint of said upper frame with a midpoint of said lower frame and is provided with mounting means to be mounted on said first mounting member.

40. The lapping apparatus as set forth in claim 19, wherein said second mounting member is made of a material, which expands and contracts when heated and cooled, and comprises:
a rectangular frame portion having an upper frame, a lower frame having a bottom surface to which a workpiece is attached, and left-hand and right-hand side frames;
at least three intermediate frames, which are in parallel with said side frames and connect said upper frame with said lower frame; and
a stationary portion which is provided in a space between said two intermediate frames and is connected to said upper frame and is provided with mounting means to be mounted on said first mounting member.

41. A lapping jig placed on a lapping plate of a lapping apparatus, comprising:
a motor mounted on a main body of said jig;
a lapping head that is attached to said main body through a rotating shaft and is caused by said motor to rotate in a direction on said lapping plate;
a workpiece mounting member provided in said lapping head;
at least two dummy work mounting members, provided in said lapping head;
lapping correction means, which is provided in said lapping head, for driving the workpiece mounting member according to a correction signal to thereby correct a lapped state of said workpiece;
a transfer lapping jig having at least one electrically actuated thermally expansible framed second mounting member adjacent said first mounting member;
sensor means adapted to be able to convert a remaining untapped quantity of said workpiece into an electrical signal;
electrical connection means, which is provided at an end portion of a rotating shaft of said lapping head and is adapted to electrically connect said rotating shaft when being in a rotating state, with an exterior thereof; and electrical wiring means for transmitting an electrical signal, which is sent from said sensor means, and a correction signal, which should be sent to said lapping correction means, with said electrical connection means through an inner portion of said rotating shaft of the lapping head.

42. The lapping jig as set forth in claim 41, wherein said electrical connection means is a multi-electrode slip ring of a shaft-end type.

43. The lapping jig as set forth in claim 41, wherein said electrical connection means is a multi-electrode induced current coupler.

44. The lapping apparatus or lapping jig as set forth in claim 41, wherein said workpiece is a plate-like bar in which plural magnetic heads are placed, and wherein said sensor means is a resistance pattern.

45. The lapping jig as set forth in claim 44, wherein said magnetic head is MR head, and wherein said sensor means is a resistance pattern formed in one piece independent of said MR head.

46. The lapping jig as set forth in claim 44, wherein said magnetic head is an MR head, and wherein said sensor means is an MR head itself.

47. The lapping jig as set forth in claim 41, wherein said lapping head comprises lapping interruption means for interrupting a lapping operation by detaching said lapping head from a lapping plate when said lapping plate rotates.

48. The lapping jig as set forth in claim 47, wherein said lapping interruption means detaches said workpiece from said lapping plate in a nearly vertical direction.

49. The lapping jig as set forth in claim 41, wherein a connector is provided halfway through said electrical wiring means, and wherein said lapping head and said workpiece mounting member are adapted to be able to be separated from each other.

50. The lapping jig as set forth in claim 41, wherein said workpiece mounting member has a rotating shaft on a straight line perpendicular to a midpoint of said workpiece and is rotatably mounted on said lapping head through said rotating shaft, and wherein said lapping correction means changes a lateral inclination of said workpiece mounting member with respect to said lapping plate and further changes a finishing rate at lateral ends of said workpiece according to said correction signal.

51. The lapping jig as set forth in claim 41, wherein said lapping head has a nearly triangular horizontal section, wherein said workpiece mounting member is attached to a side of said lapping head, and wherein said dummy workpiece mounting members are attached to remaining two sides of said lapping head.

52. The lapping jig as set forth in claim 51, wherein a contact area between a dummy workpiece, which is mounted on said dummy workpiece mounting member, and said lapping plate is equal to or greater than a contact area between said workpiece and said lapping plate.

53. The lapping jig as set forth in claim 50, wherein said lapping correction means for rotating said workpiece mounting member is plate spring displacement means for displacing an end of a plate spring attached to said workpiece mounting member.

54. The lapping jig as set forth in claim 53, wherein said plate spring displacement means is a linear actuator.

55. The lapping jig as set forth in claim 53, wherein said plate spring displacement means comprises:
   a magnetic sensitive material attached to a free end of said spring; and
   magnetic attracting means for attracting said magnetic sensitive material in response to said correction signal.

56. The lapping jig as set forth in claim 41, wherein said workpiece mounting member comprises a first mounting member and a second mounting member,
   wherein said first mounting member is rotatably mounted on said lapping head,
   wherein said second mounting member is attached to said first mounting member and has a bottom surface serving as a mounting surface on which said workpiece is mounted, and wherein a height of said mounting surface with respect to said lapping plate is able to be partly changed.

57. The lapping jig as set forth in claims 41, wherein said second mounting member is made of a material, which expands and contracts when heated and cooled, and comprises:
   a rectangular frame portion having an upper frame, a lower frame having a bottom surface to which a workpiece is attached, and left-hand and right-hand side frames;
   two oblique frames, each of which connects a corresponding one of both end portions of said upper frame with a midpoint of said lower frame; and
   a stationary portion which is a central frame connecting a midpoint of said upper frame with a midpoint of said lower frame and is provided with mounting means to be mounted on said first mounting member.

58. The lapping jig as set forth in claim 57, which further comprises: heaters that are placed among said first mounting member and said upper frame and two oblique frames of said second mounting member and is capable of heating said upper frame and two oblique frames independent of one another,
   wherein both end portions of said frame are bent in such a way as to be projected toward said lapping plate according to a heater current supplied to said heater placed at a position where said heater overlaps with said upper frame of said second mounting member,
   wherein a central portion of said lower frame is bent in such way as to be projected toward said lapping plate according to a heater current supplied to said heater placed at a position where said heater overlaps with two oblique frames of said second mounting member.

59. The lapping jig as set forth in claim 41, wherein said second mounting member is made of a material, which expands and contracts when heated and cooled, and comprises:
   a rectangular frame portion having an upper frame, a lower frame having a bottom surface to which a workpiece is attached, and left-hand and right-hand side frames;
   at least three intermediate frames, which are in parallel with said side frames and connect said upper frame with said lower frame; and
   a stationary portion which is provided in a space between said two intermediate frames and is connected to said upper frame and is provided with mounting means to be mounted on said first mounting member.

60. The lapping jig as set forth in claim 59, which further comprises: heaters that are placed among said first mounting member and said side frames of said second mounting member and intermediate frames and is capable of heating said upper frame and intermediate frames independent of one another,
   wherein the height of said lower frame from the said lapping plate is able to be partly changed according to a heater current supplied to said heater.

61. The lapping jig as set forth in claim 60, wherein grooves orthogonal to a longitudinal direction of said lower frame are placed at plural positions at predetermined intervals in a direction perpendicular to a longitudinal direction of said lower frame in a mounting surface portion, on which said workpiece is mounted, of said lower frame.

62. The lapping jig as set forth in claim 60, wherein said heaters are placed on an insulating plate, and wherein a spring for pushing said heaters toward said first mounting member is provided between said insulating plate and said first mounting member.

63. The lapping jig as set forth in claim 58, which further comprises heat-radiation preventing means for preventing heat transmitted to each frame from conducting to said upper frame and said lower frame, which is provided in connection portions between said upper frame and each frame and between said lower frame and each frame.

64. The lapping jig as set forth in claim 58, wherein said heaters are sheet-like heaters and are in close contact with said frame, which is to be heated, of said second mounting member.

65. The lapping jig as set forth in claim 64, wherein said sheet-like heaters are constituted by flexible printed cables or by sandwiching metallic foil between insulating materials.

66. The lapping jig as set forth in claim 65, wherein conductor patterns of said sheet-like heaters are copper patterns.

67. The lapping jig as set forth in claim 65, wherein conductor patterns of said sheet-like heaters are nichrome patterns.

68. The lapping jig as set forth in claim 58, wherein said heaters are sheet-like heaters and are mounted on said first mounting member.

69. The lapping jig as set forth in claim 58, wherein said first mounting member and said heaters are isolated by air or by heat insulating material.

70. The lapping jig as set forth in claim 41, wherein said lapping head is provided with a probe for taking an electrical signal, which represents a remaining untapped quantity, out of said sensor means.

71. The lapping jig as set forth in claim 41, which further comprises: a relay printed circuit board, provided in said workpiece mounting means, for relaying an electrical signal, which represents a remaining unpolished quantity and is outputted from said sensor means that is provided in said workpiece, and wherein said lapping head is provided with a probe for taking an electrical signal, which represents a remaining untapped quantity, out of said relay printed circuit board.

72. The lapping jig as set forth in claim 48, wherein a connector is provided halfway through said electrical wiring means, and wherein said lapping head and said workpiece mounting member are adapted to be able to be separated from each other.

73. The lapping jig as set forth in claim 49, wherein said workpiece mounting member has a rotating shaft on a straight line perpendicular to a midpoint of said workpiece and is rotatably mounted on said lapping head through said rotating shaft, and wherein said lapping correction means changes a lateral inclination of said workpiece mounting member with respect to said lapping plate and further changes a finishing rate at lateral ends of said workpiece according to said correction signal.

74. The lapping jig as set forth in claim 50, wherein said lapping head has a nearly triangular horizontal section, wherein said workpiece mounting member is attached to a side of said lapping head, and wherein said dummy workpiece mounting members are attached to remaining two sides of said lapping head.

75. The lapping jig as set forth in claim 55, wherein said workpiece mounting member comprises a first mounting member and a second mounting member, wherein said first mounting member is rotatably mounted on said lapping head, wherein said second mounting member is attached to said first mounting member and has a bottom surface serving as a mounting surface on which said workpiece is mounted, and wherein a height of said mounting surface with respect to said lapping plate is able to be partly changed.

76. The lapping jig as set forth in claim 56, wherein said second mounting member is made of a material, which expands and contracts when heated and cooled, and comprises:

a rectangular frame portion having an upper frame, a lower frame having a bottom surface to which a workpiece is attached, and left-hand and right-hand side frames;

two oblique frames, each of which connects a corresponding one of both end portions of said upper frame with a midpoint of said lower frame; and a stationary portion which is a central frame connecting a midpoint of said upper frame with a midpoint of said lower frame and is provided with mounting means to be mounted on said first mounting member.

77. The lapping jig as set forth in claim 56, wherein said second mounting member is made of a material, which expands and contracts when heated and cooled, and comprises:

a rectangular frame portion having an upper frame, a lower frame having a bottom surface to which a workpiece is attached, and left-hand and right-hand side frames;

at least three intermediate frames, which are in parallel with said side frames and connect said upper frame with said lower frame; and a stationary portion which is provided in a space between said two intermediate frames and is connected to said upper frame and is provided with mounting means to be mounted on said first mounting member.

78. A workpiece mounting member, provided in a lapping jig placed on a lapping plate, for mounting a workpiece to be lapped on said lapping plate, comprising:

a first mounting member, attached to a lapping jig through a rotating shaft, for rotating said workpiece with respect to said lapping plate to thereby control a lateral inclination; and a second mounting member that is securely fixed to said first mounting member and has a function of bending said workpiece in such a manner that a central portion of said workpiece protrudes or both end portions thereof protrude with respect to said lapping plate.

79. The workpiece mounting member as set forth in claim 78, wherein said first mounting means is adapted so that a free end of a plate spring rigidly fixed onto the top surface thereof is displaced by plate spring displacement means provided at a side of said lapping jig.

80. The workpiece mounting member as set forth in claim 79, wherein said plate spring displacement means is a linear actuator.

81. The workpiece mounting member as set forth in claim 79, wherein said plate spring displacement means comprises:

a magnetic sensitive material attached to a free end of said spring; and magnetic attracting means for attracting said magnetic sensitive material in response to an external signal.

82. The workpiece mounting member as set forth in claim 78, wherein said second mounting member is made of a material, which expands and contracts when heated and cooled, and comprises:

a rectangular frame portion having an upper frame, a lower frame having a bottom surface to which a workpiece is attached, and left-hand and right-hand side frames;

two oblique frames, each of which connects a corresponding one of both end portions of said upper frame with a midpoint of said lower frame; and a stationary portion which is a central frame connecting a midpoint of said upper frame with a midpoint of said lower frame and is provided with mounting means to be mounted on said first mounting member.

83. The workpiece mounting means as set forth in claim 82, which further comprises: heaters that are placed among said first mounting member and said upper frame and two oblique frames of said second mounting member and is capable of heating said upper frame and two oblique frames independent of one another, wherein both end portions of said frame are bent in such a way as to be projected toward said lapping plate according to a heater current supplied to said heater placed at a position where said heater overlaps with said upper frame of said second mounting member, wherein a central portion of said lower frame is bent in such way as to be projected toward said lapping plate according to a heater current supplied to said heater placed at a position where said heater overlaps with two oblique frames of said second mounting member.

84. The workpiece mounting member as set forth in claim 78, wherein said second mounting member is made of a material which expands and contracts when heated and cooled and comprises:

a rectangular frame portion having an upper frame, a lower frame having a bottom surface to which a workpiece is attached, and left-hand and right-hand side frames;

at least three intermediate frames, which are in parallel with said side frames and connect said upper frame with said lower frame; and a stationary portion which is provided in a space between said two intermediate frames and is connected to said upper frame and is provided with mounting means to be mounted on said first mounting member.

85. The workpiece mounting member as set forth in claim 84, which further comprises: heaters that are placed among said first mounting member and said side frames of said second mounting member and intermediate frames and is capable of heating said upper frame and intermediate frames independent of one another, wherein height of said lower frame from the said lapping plate is able to be partly changed according to an amount of heater current supplied to said heater.

86. The workpiece mounting member as set forth in claim 85, wherein grooves being orthogonal to a longitudinal direction of said lower frame are placed at plural positions at predetermined intervals in a direction perpendicular to a longitudinal direction of said lower frame in a mounting surface portion, on which said workpiece is mounted, of said lower frame.

87. The workpiece mounting member as set forth in claim 85, wherein said heaters are placed on an insulating plate, and wherein a spring for pushing said heaters toward said first mounting member is provided between said insulating plate and said first mounting member.

88. The workpiece mounting member as set forth in claim 83, which further comprises heat-radiation preventing means for preventing heat transmitted to each frame from conducting to said upper frame and said lower frame, which is provided in connection portions between said upper frame and each frame and between said lower frame and each frame.

89. The workpiece mounting member as set forth in claim 83, wherein said heaters are sheet-like heaters and are in close contact with said frame, which is to be heated, of said second mounting member.

90. The workpiece mounting member as set forth in claim 89, wherein said sheet-like heaters are constituted by flexible printed cables or by sandwiching metallic foil between insulating materials.

91. The workpiece mounting member as set forth in claim 90, wherein conductor patterns of said sheet-like heaters are copper patterns.

92. The workpiece mounting member as set forth in claim 81, wherein conductor patterns of said sheet-like heaters are nichrome patterns.

93. The workpiece mounting member as set forth in claim 83, wherein said heaters are sheet-like heaters and are mounted on said first mounting member.

94. The workpiece mounting member as set forth in claim 93, wherein said first mounting member and said heaters are isolated by air or by heat insulating material.

95. The workpiece mounting member as set forth in claim 81, wherein said second mounting member is made of a material, which expands and contracts when heated and cooled, and comprises:

a rectangular frame portion having an upper frame, a lower frame having a bottom surface to which a workpiece is attached, and left-hand and right-hand side frames;

two oblique frames, each of which connects a corresponding one of both end portions of said upper frame with a midpoint of said lower frame; and a stationary portion which is a central frame connecting a midpoint of said upper frame with a midpoint of said lower frame and is provided with mounting means to be mounted on said first mounting member.

96. The workpiece mounting means as set forth in claim 95, which further comprises: heaters that are placed among said first mounting member and said upper frame and two oblique frames of said second mounting member and is capable of heating said upper frame and two oblique frames independent of one another, wherein both end portions of said frame are bent in such a way as to be projected toward said lapping plate according to a heater current supplied to said heater placed at a position where said heater overlaps with said upper frame of said second mounting member, wherein a central portion of said lower frame is bent in such way as to be projected toward said lapping plate according to a heater current supplied to said heater placed at a position where said heater overlaps with two oblique frames of said second mounting member.

97. The workpiece mounting member as set forth in claim 82, wherein said second mounting member is made of a material which expands and contracts when heated and cooled and comprises:

a rectangular frame portion having an upper frame, a lower frame having a bottom surface to which a workpiece is attached, and left-hand and right-hand side frames;

at least three intermediate frames, which are in parallel with said side frames and connect said upper frame with said lower frame; and a stationary portion which is provided in a space between said two intermediate frames and is connected to said upper frame and is provided with mounting means to be mounted on said first mounting member.

98. The workpiece mounting member as set forth in claim 97, which further comprises: heaters that are placed among said first mounting member and said side frames of said second mounting member and intermediate frames and is capable of heating said upper frame and intermediate frames independent of one another, wherein height of said lower frame from said lapping plate is able to be partly changed according to an amount of heater current supplied to said heater.

99. The workpiece mounting member as set forth in claim 98, wherein grooves being orthogonal to a longitudinal direction of said lower frame are placed at plural positions at predetermined intervals in a direction perpendicular to a longitudinal direction of said lower frame in a mounting surface portion, on which said workpiece is mounted, of said lower frame.

100. The workpiece mounting member as set forth in claim 86, wherein said heaters are placed on an insulating plate, and wherein a spring for pushing said heaters toward said first mounting member is provided between said insulating plate and said first mounting member.

101. The workpiece mounting member as set forth in claim 97, wherein said heaters are placed on an insulating plate, and wherein a spring for pushing said heaters toward said first mounting member is provided between said insulating plate and said first mounting member.

102. The workpiece mounting member as set forth in claim 98, wherein said heaters are placed on an insulating plate, and wherein a spring for pushing said heaters toward said first mounting member is provided between said insulating plate and said first mounting member.

103. The workpiece mounting member as set forth in claim 96, which further comprises heat-radiation preventing means for preventing heat transmitted to each frame from conducting to said upper frame and said lower frame, which is provided in connection portions between said upper frame and each frame and between said lower frame and each frame.

104. The workpiece mounting member as set forth in claim 96, wherein said heaters are sheet-like heaters and are in close contact with said frame, which is to be heated, of said second mounting member.

105. The workpiece mounting member as set forth in claim 85, wherein said heaters are sheet-like heaters and are mounted on said first mounting member.

106. The workpiece mounting member as set forth in claim 105, wherein said first mounting member and said heaters are isolated by air or by heat insulating material.

107. A workpiece mounting member, provided in a lapping jig placed on a lapping plate, for mounting a workpiece to be lapped on said lapping plate, comprising:

a mounting-member main body having a bottom surface to which said workpiece is attached;

a rotating mechanism, provided in a central portion of said mounting-member main body, for rotating said mounting-member main body with respect to said lapping jig; and an inclination regulation mechanism for rotating said mounting-member main body around said rotating mechanism to thereby regulate a lateral inclination of said workpiece with respect to said lapping plate.

108. The workpiece mounting member as set forth in claim 107, wherein said inclination regulation mechanism comprises:

a plate spring rigidly fixed onto the top surface of said mounting-member main body; and plate spring displacement means, provided at a side of said lapping jig, for displacing a free end of said plate spring.

109. The workpiece mounting member as set forth in claim 108, wherein said plate spring displacement means is a linear actuator.

110. The workpiece mounting member as set forth in claim 108, wherein said plate spring displacement means comprises:

a magnetic sensitive material attached to a free end of said spring; and magnetic attracting means for attracting said magnetic sensitive material in response to an external signal.

111. A workpiece mounting member secured adjacent a first pivotable workpiece mounting member, provided in a lapping jig placed on a lapping plate, for mounting a workpiece to be lapped on said lapping plate, wherein said mounting member is made of a material, which expands and contracts when heated and cooled, and comprises:

a rectangular frame portion having an upper frame, a lower frame having a bottom surface to which a workpiece is attached, and left-hand and right-hand side frames;

two oblique frames, each of which connects a corresponding one of both end portions of said upper frame with a midpoint of said lower frame;

a stationary portion which is a central frame connecting a midpoint of said upper frame with a midpoint of said lower frame and is provided with mounting means for mounting said workpiece onto said lapping jig;

first heaters placed adjacently to said upper frame; and second heaters placed adjacently to two oblique frames, wherein both end portions of said lower frame are bent in such a way as to be projected toward said lapping plate according to a heater current supplied to said first heater, and wherein a central portion of said lower frame is bent in such way as to be projected toward said lapping plate according to a heater current supplied to said second heater.

112. The workpiece mounting member as set forth in claim 111, which further comprises heat-radiation preventing means for preventing heat transmitted to each frame from conducting to said upper frame and said lower frame, which is provided in connection portions between said upper frame and each frame and between said lower frame and each frame.

113. The workpiece mounting member as set forth in claim 111, wherein said heaters are sheet-like heaters and are in close contact with said frame, which is required to be heated.

114. The workpiece mounting member as set forth in claim 113, wherein said sheet-shaped heaters are constituted by flexible printed cables or by sandwiching metallic foil between insulating materials.

115. The workpiece mounting member as set forth in claim 114, wherein conductor patterns of said sheet-shaped heaters are copper patterns.

116. The workpiece mounting member as set forth in claim 114, wherein conductor patterns of said sheet-shaped heaters are nichrome patterns.

117. The workpiece mounting member as set forth in claim 111, wherein said heaters are sheet-shaped heaters and are mounted on said first mounting member.

118. The workpiece mounting member as set forth in claim 117, wherein said lapping jig and said heaters are isolated by air or by heat insulating material.

119. A workpiece mounting member secured adjacent a first pivotable workpiece mounting member, provided in a lapping jig placed on a lapping plate, for mounting a workpiece to be lapped on said lapping plate, wherein said mounting member is made of a material, which expands and contracts when heated and cooled, and comprises:

- a rectangular frame portion having an upper frame, a lower frame having a bottom surface to which a workpiece is attached, and left-hand and right-hand side frames;
- at least three intermediate frames, which are in parallel with said side frames and connect said upper frame with said lower frame; and
- a stationary portion which is provided in a space between said two intermediate frames and is connected to said upper frame and is provided with mounting means to be mounted on said lapping jig, and
- heaters that are placed adjacently to said side frames and intermediate frames and is capable of heating said upper frame and intermediate frames independent of one another, and
- wherein height of said lower frame from said lapping plate is able to partly change according to an amount of heater current supplied to said heater.

120. The workpiece mounting member as set forth in claim 119, wherein grooves being orthogonal to a longitudinal direction of said lower frame are placed at plural positions at predetermined intervals in a direction perpendicular to a longitudinal direction of said lower frame in a mounting surface portion, on which said workpiece is mounted, of said lower frame.

121. The workpiece mounting member as set forth in claim 120, which further comprises heat-radiation preventing means for preventing heat transmitted to each frame from conducting to said upper frame and said lower frame, which is provided in connection portions between said upper frame and each frame and between said lower frame and each frame.

122. The workpiece mounting member as set forth in claim 119, which further comprises heat-radiation preventing means for preventing heat transmitted to each frame from conducting to said upper frame and said lower frame, which is provided in connection portions between said upper frame and each frame and between said lower frame and each frame.

123. The workpiece mounting member as set forth in claim 119, wherein said heaters are sheet-like heaters and are in close contact with said frame, which is required to be heated.

124. The workpiece mounting member as set forth in claim 123, wherein said sheet-shaped heaters are constituted by flexible printed cables or by sandwiching metallic foil between insulating materials.

125. The workpiece mounting member as set forth in claim 124, wherein conductor patterns of said sheet-like heaters are copper patterns.

126. The workpiece mounting member as set forth in claim 124, wherein conductor patterns of said sheet-like heaters are nichrome patterns.

127. The workpiece mounting member as set forth in claim 119, wherein said heaters are sheet-like heaters and are mounted on said first mounting member.

128. The workpiece mounting member as set forth in claim 127, wherein said lapping jig and said heaters are isolated by air or by heat insulating material.

* * * * *

UNITED STATES PATENT AND TRADEMARK OFFICE
CERTIFICATE OF CORRECTION

PATENT NO.    : 6,074,283
DATED         : June 13, 2000
INVENTOR(S)   : Maeda et al.

Page 1 of 1

It is certified that error appears in the above-identified patent and that said Letters Patent is hereby corrected as shown below:

Column 22,
Line 35, delete "actvatably" and insert -- actuatably --.
Line 38, delete "memeber" and insert -- member --.
Line 44, delete "untapped" and insert -- unlapped --.

Column 25,
Line 37, delete "untapped" and insert -- unlapped --.
Line 46, delete "untapped" and insert -- unlapped --.

Column 26,
Line 62, delete "untapped" and insert -- unlapped --.

Column 29,
Line 40, delete "untapped" and insert -- unlapped --.
Line 49, delete "untapped" and insert -- unlapped --.

Signed and Sealed this

Thirtieth Day of October, 2001

Attest:

*Attesting Officer*

NICHOLAS P. GODICI
*Acting Director of the United States Patent and Trademark Office*